United States Patent
Mase

(10) Patent No.: US 10,028,206 B2
(45) Date of Patent: *Jul. 17, 2018

(54) MANAGEMENT SYSTEM

(71) Applicant: Grace T. Mase, Glendale, CA (US)

(72) Inventor: Grace T. Mase, Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/092,373

(22) Filed: Apr. 6, 2016

(65) Prior Publication Data
US 2016/0302240 A1 Oct. 13, 2016

Related U.S. Application Data

(60) Provisional application No. 62/146,830, filed on Apr. 13, 2015.

(51) Int. Cl.
*H04W 48/16* (2009.01)
*H04W 4/02* (2018.01)

(52) U.S. Cl.
CPC .......... *H04W 48/16* (2013.01); *H04W 4/02* (2013.01)

(58) Field of Classification Search
CPC ...... H04W 48/16; H04W 4/02; H04L 65/403; H04L 63/08; H04L 67/02; G06F 3/04842
See application file for complete search history.

(56) References Cited

U.S. PATENT DOCUMENTS

| 8,380,709 | B1* | 2/2013 | Diller ................. G06F 17/3053 707/723 |
| 2006/0047615 | A1* | 3/2006 | Ravin .................... G06N 5/022 706/50 |
| 2009/0198509 | A1* | 8/2009 | Dumoff .......... G06Q 10/063112 705/2 |
| 2010/0250578 | A1* | 9/2010 | Athsani ............. G06F 17/30867 707/765 |
| 2013/0182834 | A1* | 7/2013 | Lauffer ............. G06Q 10/0631 379/265.09 |
| 2015/0012631 | A1* | 1/2015 | Udani ................ G06Q 30/0283 709/223 |
| 2016/0110674 | A1* | 4/2016 | Berman ......... G06Q 10/063112 705/7.14 |

* cited by examiner

*Primary Examiner* — Walli Butt
(74) *Attorney, Agent, or Firm* — Kilpatrick Townsend & Stockton LLP

(57) ABSTRACT

Systems and methods for generating a pairing alert are disclosed herein. The system includes: a consumer user device including: a wireless communications interface; an input element; and an output element. The system includes a provider user device including: a wireless communications interface; an input element; and an output element. The system include a server that is controlled by software code to: receive an input identifying a user; retrieve a consumer characterization value; retrieve a provider characterization value; identify a provider group based on a calculated delta value; generate a ranking of the providers of the provider group; generate a pairing alert; send the pairing alert to the user provider device from the server; and receive an input selecting at least one of the providers of the provider group in response to the pairing alert.

16 Claims, 13 Drawing Sheets

MANAGEMENT SYSTEM

CROSS-REFERENCES TO RELATED APPLICATIONS

This application claims the benefit of U.S. Provisional Application No. 62/146,830, entitled "IMPROVEMENT MANAGEMENT SYSTEM," and filed on Apr. 13, 2015, the entirety of which is hereby incorporate by reference herein.

BACKGROUND OF THE INVENTION

Wireless communication is the transfer of information between two or more points that are not connected by an electrical conductor. The most common wireless technologies use radio waves. Wireless communication encompasses various types of fixed, mobile, and portable applications, including two-way radios, cellular telephones, personal digital assistants (PDAs), and wireless networking. Other examples of applications of radio wireless technology include GPS units, garage door openers, wireless computer mice, keyboards and headsets, headphones, radio receivers, satellite television, broadcast television and cordless telephones.

BRIEF SUMMARY OF THE INVENTION

One aspect of the present disclosure relates to a system for generating a pairing alert. The system includes a consumer user device. The consumer user device includes: a wireless communications interface configured to communicate through a cellular network or through Wi-Fi; an input element configured to allow a user to input information into the consumer user device; and an output element configured to provide the user with information from the consumer user device. The system includes a provider user device. The provider user device includes: a wireless communications interface configured to communicate through a cellular network or through Wi-Fi; an input element configured to allow a user to input information into the consumer user device; and an output element configured to provide the user with information from the consumer user device. The system includes a server. The server is controlled by computer executable software code to: receive an input identifying a user; retrieve a consumer characterization value based on inputs received from the consumer user device from a user database, which user characterization value includes a first component characterizing a user attribute and a second component characterizing a project attribute; retrieve a provider characterization value based on inputs received from the provider user device from a provider database, which provider characterization value includes a first component characterizing a provider attribute and a second component characterizing a completed project attribute; identify a provider group including a plurality of providers based on a calculated delta value; generate a ranking of the providers of the provider group based on the calculated delta value; generate a pairing alert including computer code to direct the activation of the provider user device and including the ranking of the providers in the group of providers; send the pairing alert to the user provider device from the server; and receive an input selecting at least one of the providers of the provider group in response to the pairing alert.

In some embodiments, the server can generate the consumer characterization value. In some embodiments, the consumer characterization value is generated from an attribute prompt response received in response to an attribute prompt and from a project prompt response received in response to a project prompt. In some embodiments, generating the consumer characterization value includes: generating first parameters from the received attribute prompt responses; generating second parameters from the received project prompt responses; retrieving a weighting algorithm; and generating an aggregate characterization value from the generated first and second parameters. In some embodiments, generating the consumer characterization value further includes applying the weighting algorithm to the first and second parameters to generate weighted values.

In some embodiments, the server can generate a potential alert, which potential alert includes computer code that can activate the pro device. In some embodiments, the potential alert includes anonymized consumer information project information. In some embodiments, the server can send the potential alert to the provider user device when the provider user device is associated with a provider in the provider group. In some embodiments, the provider characterization value is based in part on information retrieved with location information received from the provider user device, which location information is generated via a GPS receiver.

One aspect of the present disclosure relates to a method pairing a provider user device and a pro user device. The method includes: receiving at a server an input identifying a user from a consumer user device; retrieving with the server a consumer characterization value from a user database, which consumer characterization value includes a first component characterizing a user attribute and a second component characterizing a project attribute; retrieving a provider characterization value from a provider database, which provider characterization value includes a first component characterizing a provider attribute and a second component characterizing a completed project attribute; identifying a provider group including a plurality of providers based on a calculated delta value; generating a ranking of the providers of the provider group based on the calculated delta value; generating a pairing alert including computer code to direct the activation of the provider user device and including the ranking of the providers in the group of providers; sending the pairing alert to the user provider device from the server; and receiving an input selecting at least one of the providers of the provider group in response to the pairing alert.

In some embodiments, the method includes generating the consumer characterization value. In some embodiments, the consumer characterization value is generated from an attribute prompt response received in response to an attribute prompt; and a project prompt response received in response to a project prompt. In some embodiments, generating the consumer characterization value includes: generating first parameters from the received attribute prompt responses; generating second parameters from the received project prompt responses; retrieving a weighting algorithm; and generating an aggregate characterization value from the generated first and second parameters. In some embodiments, generating the consumer characterization value further includes applying the weighting algorithm to the first and second parameters to generate weighted values.

In some embodiments, the method includes generating a potential alert, which potential alert includes computer code that can activate the pro device. In some embodiments, the potential alert includes anonymized consumer information project information. In some embodiments, the method includes sending the potential alert to the provider user device when the provider user device is associated with a provider in the provider group. In some embodiments, the provider characterization value is based in part on information retrieved with location information received from the provider user device, wherein the location information is generated via a GPS receiver.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the following appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Figure 1:
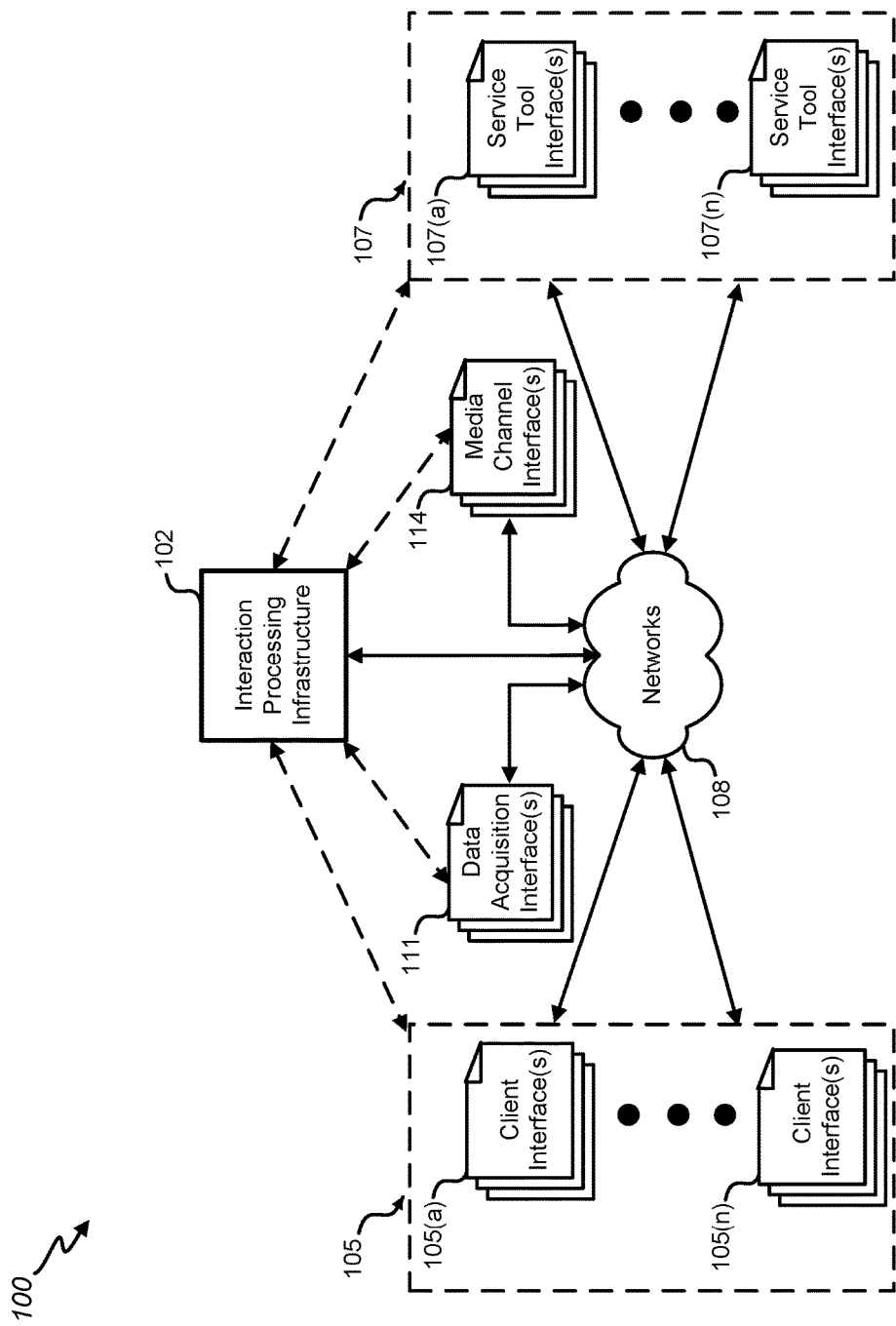
FIG. 1 is a high-level block diagram of a system, in accordance with certain embodiments of the present disclosure.

FIG. 1 depicts a high-level block diagram of a system 100, in accordance with certain embodiments of the present disclosure. The system 100 may allow for interaction between two or more of an interaction processing infrastructure 102 (sometimes referenced herein as interaction infrastructure 102), client interfaces 105, service tool interfaces 107, data acquisition interfaces 111, and/or media channel interfaces 114. As depicted, components of the system 100 may be communicatively coupled or couplable to one or more networks 108.

The one or more networks 108 may be a suitable means to facilitate data transfer in the system 100 and could include multiple networks and/or network components. In various embodiments, the one or more networks 108 may be implemented with, without limitation, one or more of the Internet, a wide area network (WAN), a local area network (LAN) such as one based on Ethernet, Token-Ring and/or the like, a wireless network (e.g., a network operating under Bluetooth®, any of the Institute of Electrical and Electronics (IEEE) 802.11 suite of protocols, and/or any other wireless protocol), a wireless local area network (WLAN), a cellular network, such as through 4G, 3G, GSM (Global System for Mobile Communications), etc., another wireless network, a gateway, a public switched telephone network (PSTN), and/or any other appropriate architecture or system that facilitates the communication of signals, data, and/or messages. In various embodiments, the one or more networks 108 may transmit data using any suitable communication protocol(s), such as, without limitation, TCP/IP (transmission control protocol/Internet protocol), SNA (systems network architecture), IPX (Internet packet exchange), AppleTalk, and/or the like. In various embodiments, the one or more networks 108 and its various components may be implemented using hardware, software, and communications media such wires, optical fibers, microwaves, radio waves, and other electromagnetic and/or optical carriers; and/or any combination of the foregoing and/or the like. In some embodiments, the network 108 may include a telephone network that may be circuit switched, package switched, or partially circuit switched and partially package switched. For example, the telephone network may partially use the Internet to carry phone calls (e.g., through VoIP).

The interaction processing infrastructure 102 may facilitate searching of one or more information repositories in response to data received over the one or more networks 108 from any one or combination of the interfaces. In various embodiments, the interaction processing infrastructure 102 may include a set of devices configured to process, transform, encode, translate, send, receive, retrieve, detect, generate, compute, organize, categorize, qualify, store, display, present, handle, or use information and/or data suitable for the embodiments described herein. The interaction processing infrastructure 102 may be implemented in or with a distributed computing and/or cloud computing environment with a plurality of servers and cloud-implemented resources. The interaction processing infrastructure 102 may include processing resources communicatively coupled to storage media, random access memory (RAM), read-only memory (ROM), and/or other types of memory. The interaction processing infrastructure 102 may include various input and output (I/O) devices, network ports, and display devices.

In certain embodiments, the interaction processing infrastructure 102 may be communicatively coupled or couplable to one or more data sources via one or more data acquisition interfaces 111. The one or more data sources may include any suitable source of data to facilitate embodiments disclosed further herein. In various embodiments, the one or more data sources may include one or more of a database, a website, any repository of data in any suitable form, and/or a third party system. In various embodiments, the one or more data sources may correspond to one or more social media websites and/or photo-sharing websites. With some embodiments, the data sources may include one or more mobile computing device locator services that provide information regarding the location of one or more client devices 205 and/or 207 (depicted in FIG. 2A). With some embodiments, the data sources may provide various details relating to call data. With some embodiments, the data sources may provide caller name information from calling name delivery (CNAM), also known as caller identification or caller ID, may be used to determine particular details about the caller. With some embodiments, the data sources may provide information about the area of a caller. With some embodiments, the data sources may provide demographic data about an area.

In various embodiments, the data from the one or more data sources may be retrieved and/or received by the interaction processing infrastructure 102 via the one or more data acquisition interfaces 111 through network(s) 108 and/or through any other suitable means of transferring data. In some embodiments, the interaction processing infrastructure 102 and the data sources could use any suitable means for direct communication. According to certain embodiments, data may be actively gathered and/or pulled from one or more data sources, for example, by accessing a third party repository and/or by "crawling" various repositories. Certain data pulled and/or pushed from the one or more data sources may be transformed and the transformed data and/or other data generated based thereon may be made available by the interaction processing infrastructure 102 for users of client devices 205 and/or 207. In some embodiments, the users can include one or several consumers and/or one or several service providers, also referred to herein as pros. In some embodiments, these one or several service providers or pros can include, for example, a designer, an architect, an interior designer, an electrical engineer, a structural engineer, a mechanical engineer, a civil engineer, a builder, a general contractor, a trade contractor, a sub-contractor, or the like. In some embodiments, the client device(s) 205 can be consumer devices, and the client device(s) 207 can be provider devices. In alternative embodiments, data from the one or more data sources may be made available directly to client devices 205 and/or 207.

In some embodiments, the one or more data acquisition interfaces 111 may be implemented in similar manner to interfaces 105 and/or 107 or any other suitable interface. In some embodiments, the one or more data acquisition interfaces 111 may include one or more application programming interfaces (APIs) that define protocols and routines for interfacing with the data sources. The APIs may specify application programming interface (API) calls to/from data source systems. In some embodiments, the APIs may include a plug-in to integrate with an application of a data source system. The one or more data acquisition interfaces 111, in some embodiments, could use a number of API translation profiles configured to allow interface with the one or more additional applications of the data sources to access data (e.g., a database or other data store) of the data sources. The API translation profiles may translate the protocols and routines of the data source system to integrate at least temporarily with the system and allow communication with the system by way of API calls. Data, as referenced herein, may correspond to any one or combination of raw data, unstructured data, structured data, information, and/or content which may include media content, text, documents, files, instructions, code, executable files, images, video, audio, and/or any other suitable content suitable for embodiments of the present disclosure.

According to certain embodiments, the interaction processing infrastructure 102 may include or provide a service management platform. A provider may access the interaction processing infrastructure 102 via a service tool interface 107. An end user may access the interaction processing infrastructure 102 via a client interface 105. The interaction processing infrastructure 102 may facilitate searching of one or more information repositories in response to information received over the network 108 from the client interfaces 105 and/or service tool interfaces 107.

The client interfaces 105 and/or service tool interfaces 107 may allow for transfer of and access to information in accordance with certain embodiments disclosed herein. In various embodiments, the client interface(s) 105 and/or service tool interface(s) 107 may include one or more suitable input/output modules and/or other system/devices operable to serve as an interface between a service provider(s) and the provider management platform. The client interfaces 105 and/or service tool interfaces 107 may facilitate communication over the network 108 using any suitable transmission protocol and/or standard. In various embodiments, the interaction infrastructure 102 may include, provide, and/or be configured for operation with the client interfaces 105 and/or service tool interfaces 107, for example, by making available and/or communicating with one or more of a website, a web page, a web portal, a web application, a mobile application, enterprise software, and/or any suitable application software. In some embodiments, a client interface 105 and/or service tool interface 107 may include an API to interact with the interaction infrastructure 102.

In some embodiments, a client interface 105 and/or a service tool interface 107 may include a web interface. In some embodiments, the client interface 105 and/or service tool interface 107 may include or work with an application made available to one or more interfaces, such as a mobile application as discussed herein. In some embodiments, the client interface 105 and/or service tool interface 107 may cause a web page to be displayed on a browser of a service provider. The web page(s) may display output and receive input from a user (e.g., by using Web-based forms, via hyperlinks, electronic buttons, etc.). A variety of techniques can be used to create the web pages and/or display/receive information, such as JavaScript, Java applications or applets, dynamic HTML and/or AJAX technologies. Accordingly, the interaction processing infrastructure 102 may have web site(s)/portal(s) giving access to such information, such as a provider portal.

In various embodiments, a client interface 105 and/or a service tool interface 107 may include providing one or more display screen images that may each include one or more user interface elements. A user interface may include any text, image, and/or device that can be displayed on a display screen for providing information to a user and/or for receiving user input. A user interface may include one or more widgets, windows, dashboards, text, text boxes, text fields, tables, grids, charts, hyperlinks, buttons, lists, combo boxes, checkboxes, radio buttons, and/or the like.

In certain embodiments, a client interface 105 and/or a service tool interface 107 may include a computing device of an end user and/or a service provider. In certain embodiments, a client interface 105 and/or a service tool interface 107 may include a mobile computing device that may be any portable device suitable for sending and receiving information over a network in accordance with embodiments described herein.

Certain embodiments may provide a multi-channel communication regime to coordinate multiple communication channels used by end users and providers. Multiple communication pipes within a communication pipe could be implemented according to certain embodiments. Some embodiments may implement a greater number of communication channels. For example, one set of channels could be used for an end user to request help, and one set of channels could be used for a provider to respond to the end user. The system can use web communication, text communication, voice communication, e-mail communication, push notification, and/or the like.

According to certain embodiments, the interaction processing infrastructure 102 may be or include a content provisioning platform. In some embodiments, the interaction processing infrastructure 102 may provide for the selection, generation, and provision of content objects to one or more client interfaces 105. In certain embodiments, providers may have content objects that may be placed in a web page made available to one or more client interfaces 105. In certain embodiments, providers may have content objects that may be displayed with an application made available to one or more client interfaces 105, such as a mobile application according to various embodiments. In some embodiments, placement of the content objects could be in accordance with one or more paid placement arrangements and one or more content presentation models.

Content objects may be included in a results page responsive to a keyword search initiated by an end user via, for example, a webpage and/or a mobile application. The search may be performed by an online search engine facilitated by the interaction processing infrastructure 102. A content object of provider may be included within a results page with results identified and/or compiled by the search engine and sent via the network 108 to the client interface 105 of the end user that initiated the search.

An end user, in various embodiments, may correspond to an end user of products, services, and/or information. A provider, in various embodiments, may correspond to (and may be variously referenced herein by) any one or combination of a service provider, a product provider, a merchant, a commercial entity ("entity"), an advisor, a representative, and/or the like. End users may use one or more client interfaces 105; providers may use one or more service tool interfaces 107.

Figure 2:
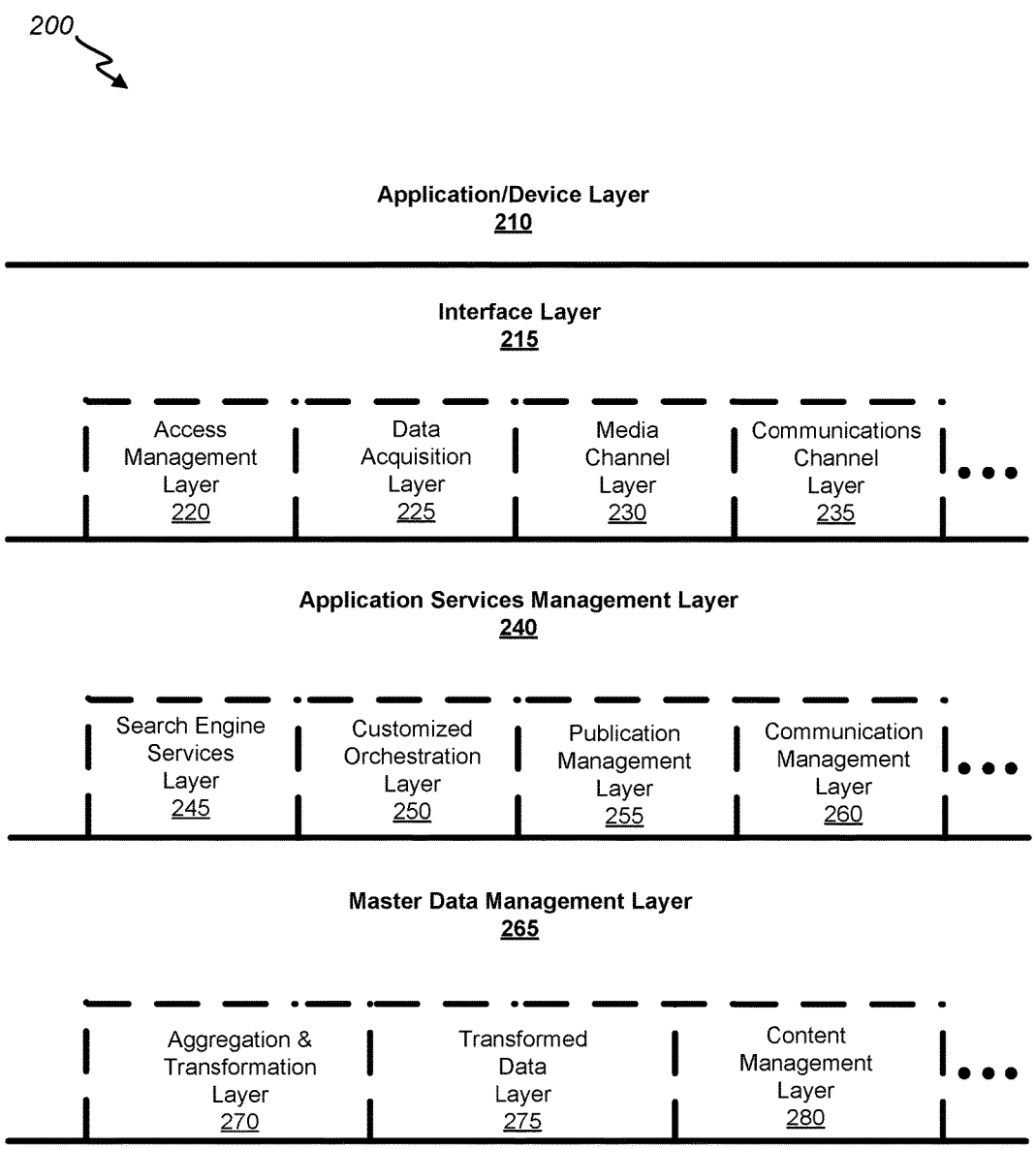
FIGS. 2 and 2A-2C show diagrams of an architecture stack of the interaction infrastructure 102, in accordance with certain embodiments of the present disclosure, in accordance with certain embodiments of the present disclosure.

FIG. 2 shows a diagram of an architecture stack 200 of the interaction infrastructure 102, in accordance with certain embodiments of the present disclosure. While architecture stack 200 is illustrated as having a particular structure, it should be understood that certain embodiments may include other structures, including those with more or less layers than illustrated, in varying orientations and divisions. The architecture stack 200 may be implemented across a plurality of systems and/or subsystems corresponding to the interaction infrastructure 102. In some embodiments, a multi-layer part of the architecture stack 200 may be implemented at a single system or device within the interaction infrastructure 102.

The different layers of the architecture stack 200 are described generally herein with reference to FIG. 2 and in detail with reference to subsequent figures. From a high level perspective, the architecture stack 200 may include an application and/or device layer 210, an application services management layer 240, and/or a master data management layer 265. The application and/or device layer 210, the application services management layer 240, and/or the master data management layer 265 may include or otherwise interface with any of various sublayers. In some embodiments, the application and/or device layer 210, the application services management layer 240, and/or the master data management layer 265 may share resources and services with any one or combination of sublayers; and, in some embodiments, certain sublayers may share resources and services with certain other sublayers.

The application/device layer 210 may include user devices and applications for interacting with the other elements of the architecture stack 200 via the elements of an interface layer 215. For example, the applications may include web-based applications, entity portals, mobile applications, widgets, and the like for requesting services from and/or otherwise accessing the interaction infrastructure 102. These applications may run on one or more user devices. The user devices may be any suitable user device as detailed herein.

The interface layer 215 of the architecture stack 200 may provide interfaces for a user device to interact with the other elements of the architecture stack 200. For example, clients, entities, administrators, and others serviced by and/or otherwise associated with the interaction infrastructure 102 may utilize one or more user devices interacting within the application/device layer 210 to request services and/or access from an application services management layer 240. In some examples, a web-based search interface, a mobile application search interface, an orchestration platform interface, a provider dashboard interface, and/or the like may be provided.

In various embodiments, the interface layer 215 may include or otherwise interface with any one or combination of an access management layer 220, a data acquisition layer 225, a media channel layer 220, a communications channel layer 235, and/or the like layer in accordance with embodiments disclosed herein.

The architecture stack 200 may include an access management layer 220. The access management layer 220 may include elements to manage access to services and/or data. For example, the access management layer 220 may include elements to verify user login credentials, IP addresses associated with a user device, device IDs, telephone numbers, locations, and/or the like in order to provide certain services and/or access.

The architecture stack 200 may include a data acquisition layer 225. In some embodiments, the data acquisition layer 225 may be included in the application services management layer 240. The data acquisition layer 225 may receive data from various data sources to facilitate various embodiments disclosed herein. The any one or combination of data sources disclosed herein and/or the like, with aggregation being facilitated in some embodiments with any one or combination of interfaces 105, 107, 111, 114 and/or client devices 205, 207.

The architecture stack 200 may include a media channel layer 220. The media channel layer 220 may provide interfaces for the interaction infrastructure 102 to utilize various media channels. For example, services may be provided to clients, entities, administrators, and others serviced by and/or otherwise associated with the interaction infrastructure 102 by way of media channels of many various types including websites, mobile applications, social/business network websites, cable and satellite television, telephone systems, video distribution, and print (e.g., newspapers and magazines).

The architecture stack 200 may include a communications channel layer 235. The communications channel layer 235 may provide interfaces for the interaction infrastructure 102 to centrally manage services based on real-time communications. For example, services may be provided to clients, entities, administrators, and others serviced by and/or otherwise associated with the interaction infrastructure 102 by way of tracking and/or handling of communications such as telephone calls, video calls, messages, chats, video conferencing, and/or the like in response to content objects presented through the various media channels.

In various embodiments, the application services management layer 240 may include or otherwise interface with any one or combination of a search engine services layer 245, a customized orchestration layer 250, a publication management layer 255, a communications management layer 260, and/or the like layer in accordance with embodiments disclosed herein. In various embodiments, the search engine services layer 245 may include elements to provide effective search services to end users, providers, and/or internal elements and/or users of the interaction infrastructure 102. In some embodiments, the search services may include geo-aware search services. The geo-aware search services may provide fast and efficient access to information tailored to particular geographies. In various embodiments, the master data management layer 265 may include or otherwise interface with any one or combination of an aggregation and transformation layer 270, a transformed data layer 275, a content management layer 280, and/or the like layer in accordance with embodiments disclosed herein.

Figure 2A:
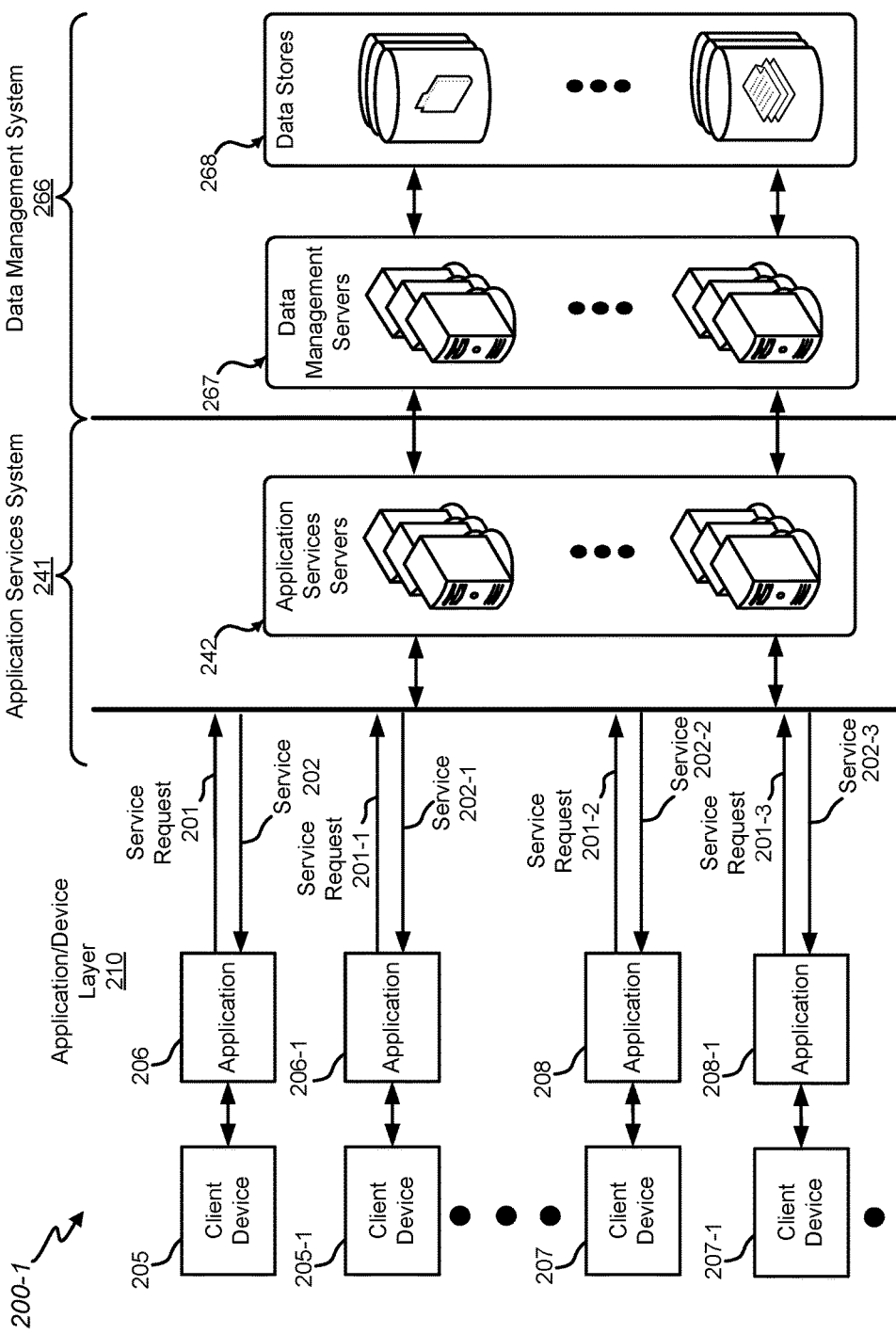

FIG. 2A shows a diagram of a portion 200-1 of the architecture stack 200 of the interaction infrastructure 102, in accordance with certain embodiments of the present disclosure. The portion 200-1 at least partially includes the application/device layer 210, as wells as an application services system 241 and a data management system 266 of the interaction infrastructure 102. In some embodiments, the application services system 241 may correspond at least partially to the interface layer 215 and the application services management layer 240. In some embodiments, the data management system 266 may correspond at least partially to the master data management layer 265.

The application services system 241 may interface with the application/device layer 210 and the data management system 266. In some embodiments, the application services system 241 may include at least part of the application/device layer 210. The application services system 241 could be a middle tier of the interaction infrastructure 102 in some embodiments, with the data management system 266 corresponding to a back-end in some embodiments.

The application services system 241 and the data management system 266 each may be or include a server system 242 and a server system 267, respectively, that include one or more servers. In various embodiments, the server systems 242, 267 may include one or more computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, the server systems 242, 267 may be adapted to run one or more services, operations, processing, or software applications described herein. The server systems 242, 267 may run an operating system including any of those discussed above, as well as any commercially available server operating system. The server systems 242, 267 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Entity Machines), and the like.

In some embodiments, the server systems 242, 267 may include one or more applications to analyze and consolidate data feeds and/or event updates received from various data sources. As an example, data feeds and/or event updates may include, but are not limited to, application 206, 208 updates, Twitter® feeds, Facebook® updates, updates (real-time and/or otherwise) received from one or more third party information sources and/or continuous data streams, which may include real-time events related to sensor data applications, and/or the like. The server system 242 may also include one or more applications to display the data feeds and/or real-time events via the client devices 205, 207 and/or devices internal to the interaction infrastructure 102.

The application services system 241 and/or the data management system 266 may also include one or more data stores 268. The data stores 268 may retain any data suitable for embodiments of this disclosure. The data stores 268 may include database(s), database management system(s), server(s) to facilitate management/provision/transfer of data related to embodiments of this disclosure. In various embodiments, the data stores 268 may be implemented in various ways. For example, one or more relational or object-oriented databases, or flat files on one or more computers or networked storage devices, may store the information.

The data stores 268 may reside in a variety of locations, such as on a non-transitory storage medium local to (and/or resident in) the server systems 242, 267 and/or remote from the server systems 242, 267 and in communication with the server systems 242, 267 via a network-based or dedicated connection. In certain embodiments, the data stores 268 may reside in a storage-area network (SAN). Similarly, any necessary files for performing the functions attributed to the server systems 242, 267 may be stored locally on the server systems 242, 267 and/or remotely, as appropriate. In one set of embodiments, the data stores 268 may include relational databases that are adapted to store, update, and retrieve data in response to SQL-formatted commands. It should be appreciated that information corresponding to the repositories may be stored elsewhere and/or in other ways, or may not be stored, depending on the implementations chosen. Likewise, while various segregations of data corresponding to the repositories are provided herein, it should be appreciated that such examples are non-limiting, and some or all the data may be handled in any suitable manner.

Figure 4:
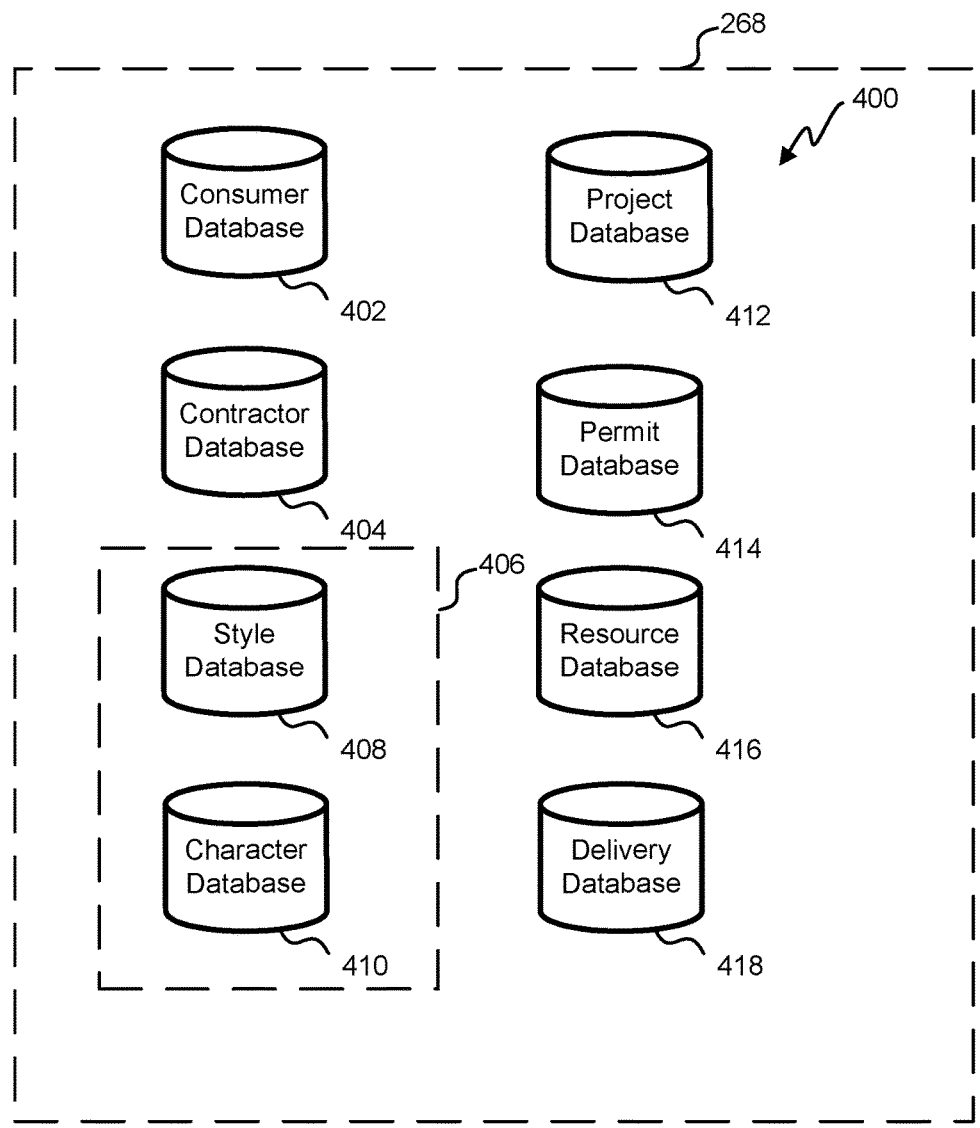
FIG. 4 is a schematic depiction of one embodiment of databases in accordance with certain embodiments of the present disclosure.

In some embodiments, the data stores 268 can comprise a plurality of databases, as is depicted in FIG. 4. FIG. 4 is a schematic depiction of one embodiment of databases 400. These databases 400 can include the consumer database 402 that can include one or several user accounts containing information relating to one or several consumers. In some embodiments, the consumer accounts can include information such as, for example, information characterizing one or several aspects of the consumer's personality, working style, design style, or the like. In some embodiments, the consumer account can further include information such as, for example, logon information including a username and a password.

These databases 400 can include a pro database 404, also referred to herein as the contractor database. The pro database 404 can include one or several pro accounts containing information relating to one or several pros. The pro accounts can include information such as, for example, information characterizing one or several aspects of the pro's personality, working style, design style, credentials, reviews, or the like. In some embodiments, pro database 404 can include a portfolio containing pictures, descriptions, and/or other data relating to past projects performed and/or completed by the pro. In some embodiments, the pro account can further include information such as, for example, logon information including a username and password.

These databases 400 can include a prompt database 406, also referred to herein as a questions database, that can include one or several prompts or questions used in aggregating information to characterize one or several consumers and/or the one or several pros. In some embodiments, questions database 406 can be divided into, and/or include a style database 408 and a character database 410. In some embodiments, the style database 408 can include information can be used to determine the style, such as a design style of one or both of the consumer and the pro. In some embodiments, this can include, for example, one or several pictures that capture one or several completed projects and/or aspects of one or several complete projects. In some embodiments, the style database 408 can further include questions relating to those one or several pictures that can be used, in connection with pictures, to determine the consumers and/or pro style preferences.

The character database 410 of the prompt database 416 can include one or several prompts that can be used to ascertain and/or determine the personality and/or character of the consumer and/or pro. In some embodiments, these prompts can be used to determine one or several personality traits of the consumer and/or pro, one or several working traits of the consumer and/or pro, or the like. Specifically, in some embodiments, a user can provide a response to one of the prompts, which response can be used as a feature in a predictive model to predict the one or several personality traits of the user and/or one or several working traits of the user.

The database server 104 can further include a project database 412. In some embodiments, the project database 412 can contain information relating to one or several projects provided by one or several consumers. This information can include, for example, information defining the scope of the project, the timeframe for starting and/or completing the project, budgetary constraints for the project, one or several desired project outcomes, and/or the like. The information in the project database can be received from the consumer.

The database server 104 can include a permit database 414. The permit database can include information relating to one or several permits including, for example, building permits for one or several properties. In some embodiments, the database server 104 can include a resource database 416. The resource database can include information identifying one or several resources for use by the consumer. These resources can include, for example, one or several material suppliers, subcontractors, inspectors, lenders, sources for second opinions, or the like.

In some embodiments, the database server 104 can include a delivery database 418. The delivery database 418 can include content to assist the user in completion and/or management of the project. This content can include, for example, one or several learning modules identifying steps to the completion of the project and/or best practices for the completion the project.

In certain embodiments, the interaction infrastructure 102 may be implemented in or with a distributed computing and/or cloud computing environment with a plurality of servers and cloud-implemented processing, memory, and data resources. Thus, with accretion of service information, the system may allow for scaling out with additional processing resources, server resources, data storage resources, data management resources, and the like. Some embodiments may use different types of servers to service different types of client device 205, 207.

The interaction infrastructure 102 may offer services provided by one or more components of the interaction infrastructure 102, and, in some embodiments, one or more of the services may be offered as cloud services. A specific instantiation of a service 202 provided by the interaction infrastructure 102 may be referred to herein as a service instance 202. In some examples, a service 202 provided by the interaction infrastructure 102 may include provisioning of content objects, facilitating real-time communications, exposing features of a provider platform, exposing features of an orchestration platform, providing protected computer network access to data generated and/or transformed, and stored by the infrastructure system 102, for example, via a hosted database, a hosted web server, a hosted application server, a software application, and/or the like. In certain embodiments, the interaction infrastructure 102 may include a suite of applications, middleware, and database service offerings that are delivered to clients and/or providers.

In the illustrated embodiment, one or more client devices 205, 207 may be used by users to interact with the interaction infrastructure 102. Although only a limited number of the client devices 205, 207 is shown, any number of client devices 205, 207 may be supported. In various embodiments, the client devices 205 and/or 207 may correspond to devices supporting and/or accessing a client interface 105 and/or a service tool interface 107. In some embodiments, the client devices 205 and/or 207 may correspond to devices supporting and/or accessing a data acquisition interface 111 and/or a media channel interface 114.

In various embodiments, the client devices 205 and/or 207 may be configured to operate a client application such as a web browser, a proprietary client application, a web-based application, an entity portal, a mobile application, a widget, or some other application, which may be used by a user of the client device 205, 207 to interact with the interaction infrastructure 102 to use services provided by the interaction infrastructure 102. The client devices 205 and/or 207 may be portable handheld devices (e.g., an iPhone®, cellular telephone, an iPad®, computing tablet, a personal digital assistant (PDA)) or wearable devices (e.g., Google Glass® device), running software such as Microsoft Windows Mobile®, and/or a variety of mobile operating systems such as iOS, Windows Phone, Android, BlackBerry 10, Palm OS, and/or the like, and being Internet, e-mail, short message service (SMS), Blackberry®, and/or other communication protocol enabled. In some embodiments, one or more of the client devices 205 and/or 207 can be general purpose personal computers including, by way of example, personal computers and/or laptop computers running various versions of Microsoft Windows®, Apple Macintosh®, and/or Linux operating systems. In some embodiments, one or more of the client devices 205 and/or 207 can be workstation computers running any of a variety of commercially-available UNIX® or UNIX-like operating systems, including without limitation the variety of GNU/Linux operating systems, such as for example, Google Chrome OS. Alternatively, or in addition, one or more of the client devices 205 and/or 207 may be any other electronic device, such as a thin-client computer, an Internet-enabled gaming system (e.g., a Microsoft Xbox gaming console with or without a Kinect® gesture input device), and/or a personal messaging device, capable of communicating over network(s) 108.

Figure 3A:
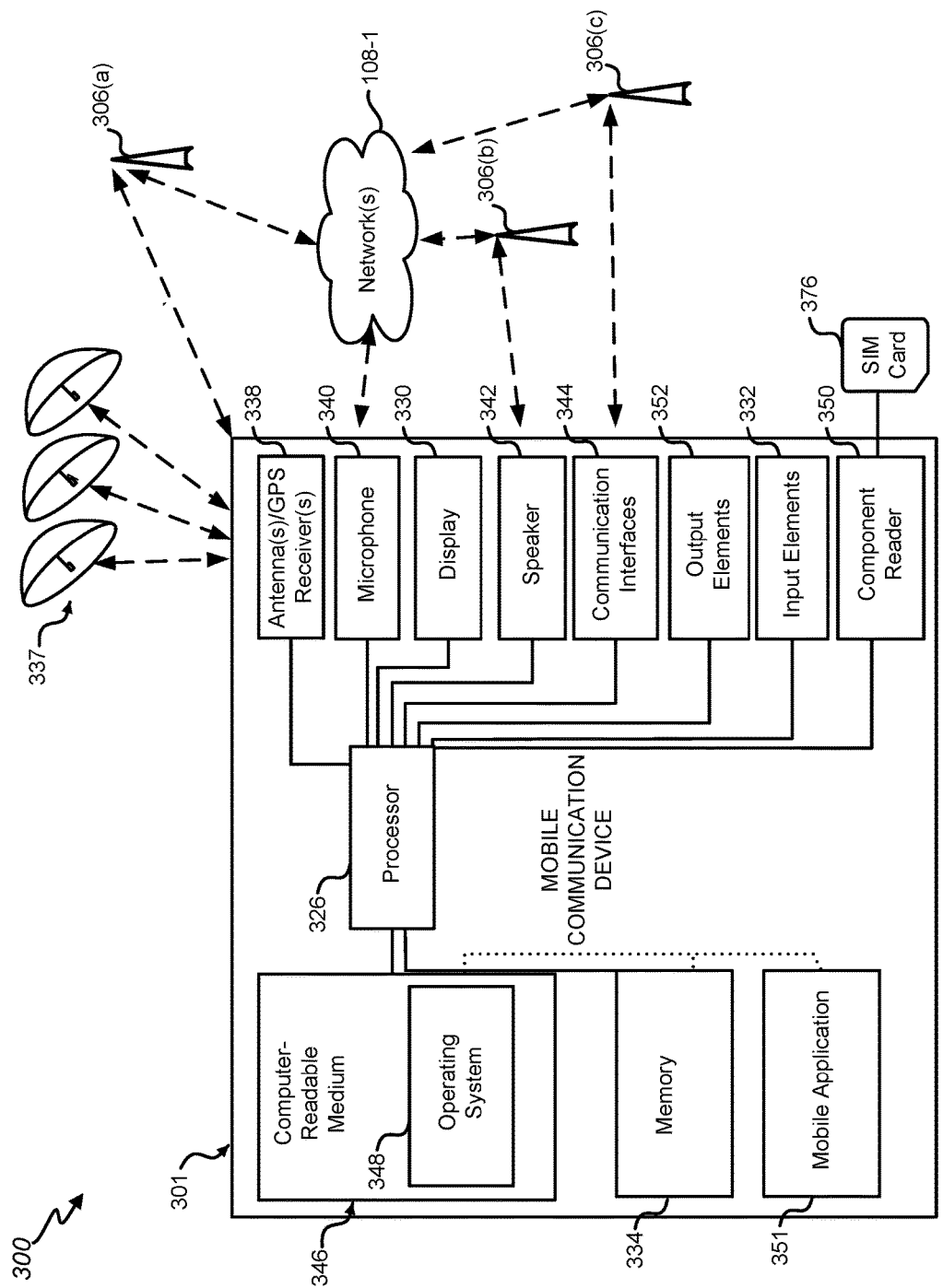
FIG. 3A is a block diagram of a system including one non-limiting example of a client device that corresponds to a mobile communication device, in accordance with certain embodiments of the present disclosure.

FIG. 3A is a block diagram of a system 300 including one non-limiting example of a client device 205 and/or 207 that corresponds to a computing device or a mobile communication device 301, in accordance with certain embodiments of the present disclosure. The mobile communication device 301 may be a portable device suitable for sending and receiving information over a network in accordance with embodiments described herein. For example without limitation, in various embodiments, the mobile communication device 301 may include one or more variously referenced as a personal computer, a mobile phone, a cellular telephone, a smartphone (for example without limitation, a smart phone such as: the iPhone® phone available from Apple Inc. of Cupertino, Calif.; Android™ operating system-based phones, available from as Google of Mountain View, Calif.; and/or the like), a handheld mobile device, a tablet computer, a web pad, a personal digital assistant (PDA), a notebook computer, a handheld computer, a laptop computer, a vehicle computer, and/or the like.

In some embodiments, the mobile communication device 301 may be provided with a mobile application 351, which may correspond to a client application configured to run on the mobile communication device 301 to facilitate various embodiments of this disclosure. In various embodiments, the mobile application 351 may correspond to application 206 and/or 208. For example without limitation, the mobile application 351 may transform the mobile communication device 301 into a communication tracking facilitator. The mobile application 351 and the mobile communication device 301 may cooperate with the interaction infrastructure 102 to facilitate tracking and/or handling of communications (e.g., calls, messages, chats, video conferencing, and/or the like) in response to content objects presented through the mobile communication device 301. The mobile application 351 can be a computer program that can be installed and run on the mobile communication device 301.

In various embodiments, mobile communication device 301 configured with the mobile application 351 may provide one or more display screens that may each include one or more user interface elements. A user interface may include any text, image, and/or device that can be displayed on a display screen for providing information to a user and/or for receiving user input. A user interface may include one or more widgets, text, text boxes, text fields, tables, grids, charts, hyperlinks, buttons, lists, combo boxes, checkboxes, radio buttons, and/or the like. As shown in FIG. 3, the mobile communication device 301 includes a display 320 and input elements 332 to allow a user to input information into the mobile communication device 301. By way of example without limitation, the input elements 332 may include one or more of a keypad, a trackball, a touchscreen, a touchpad, a pointing device, a microphone, a voice recognition device, or any other appropriate mechanism for the user to provide input. Further, the mobile communication device 301 the input elements 332 may include a communication component reader 350 for accepting a communication component such as a SIM card 376.

In some embodiments, the interaction infrastructure 102 may provide content objects of any suitable type to a user of the mobile communication device 301 through the mobile application 351. The mobile application 351 can include a utility that communicates with the interaction infrastructure 102 to control downloading, displaying, caching, and/or other operations concerning the handling of content objects. The mobile application 351 and the mobile communication device 301 may cooperate with the interaction infrastructure 102 to facilitate communication tracking in response to content objects displayed through the one or more additional applications.

In some embodiments, the client device 205 and/or 207 may include one or more additional applications, for example, that may be provided by one or more intermediaries and/or may provide functionality relating to one or more intermediaries. An intermediary may be any entity, including, for example, a news content provider, a social networking company, any entity, a gaming company, a music vendor, a multimedia content provider, and/or the like. Content objects (e.g., media objects, multimedia objects, electronic content objects, and/or the like) of any of various types may be displayed through the one or more additional applications. The mobile application 351 and the mobile communication device 301 may cooperate with the interaction infrastructure 102 to facilitate communication tracking in response to content objects displayed through the one or more additional applications. In some embodiments, the mobile application 351 could include a toolkit with client-side utility for interfacing with the one or more additional applications to facilitate tracking and/or call handling responsive to presented content. In some embodiments, the one or more additional applications could include the toolkit. In some embodiments, the mobile application 351 could be grafted into the one or more additional applications to provide tracking and/or communication handling functionalities. In some embodiments, the mobile application 351 could use a number of API translation profiles configured to allow interface with the one or more additional applications.

The user selection of a user-selectable option corresponding to a content object may involve any one or combination of various user inputs. The user selection may be in the form of a keyboard/keypad input, a touch pad input, a track ball input, a mouse input, a voice command, etc. For example, the content object may be selected by the user by pointing and clicking on the content object. As another example, the content object may be selected by an appropriate tap or movement applied to a touch screen or pad of the mobile communication device 301. The selection of a content object may initiate a voice call, video call, message, chat, and/or other communication. In some embodiments, a telephone number may be presented in content information in a format such that, when the user selects a communication reference, the client device (e.g., a cellular phone or a computer) dials a telephone number corresponding to the communication reference. For example, the call could have been initiated by end-user selecting a click-to-call option displayed via the user device. In some embodiments, user devices can automatically dial the telephone number. For example, a Dual Tone Multi-Frequency (DTMF) generator can dial a phone number. In some embodiments, the user device may initiate the phone call through a VoIP system.

In some embodiments, the mobile application 351 can run continuously (e.g., in the background) or at other times, such as when the mobile application 351 is launched by an end-user. In certain embodiments, the mobile application 351 can automatically run each time that a user accesses the one or more additional applications or selects a content object. The mobile application 351 may be provided in any suitable way. For non-limiting example, the mobile application 351 may be made available from the interaction infrastructure 102, a website, an application store, etc. for download to the mobile communication device 301; alternatively, it may be pre-installed on the mobile communication device 301. In some embodiments, the mobile application 351 can be pre-installed on the device platform by a mobile communication device manufacturer or carrier. In some embodiments, a mobile application 351 can be downloaded and installed by an end-user on their client device 205 and/or 207.

The mobile communication device 301 includes a memory 334 communicatively coupled to a processor 336 (e.g., a microprocessor) for processing the functions of the mobile communication device 301. The mobile communication device 301 may include at least one antenna 338 for wireless data transfer to communicate through a cellular network, a wireless provider network, and/or a mobile operator network, such as GSM, for example without limitation, to send and receive Short Message Service (SMS) messages or Unstructured Supplementary Service Data (USSD) messages. The mobile communication device 301 may also include a microphone 340 to allow a user to transmit voice communication through the mobile communication device 301, and a speaker 342 to allow the user to hear voice communication. The antenna 338 may include a cellular antenna (e.g., for sending and receiving cellular voice and data communication, such as through a network such as a 3G or 4G network). In addition, the mobile communication device 301 may include one or more interfaces in addition to the antenna 338, e.g., a wireless interface coupled to an antenna. The communications interfaces 344 can provide a near field communication interface (e.g., contactless interface, Bluetooth, optical interface, etc.) and/or wireless communications interfaces capable of communicating through a cellular network, such as GSM, or through Wi-Fi, such as with a wireless local area network (WLAN). Accordingly, the mobile communication device 301 may be capable of transmitting and receiving information wirelessly through both short range, radio frequency (RF) and cellular and Wi-Fi connections.

Additionally, the mobile communication device 301 can be capable of communicating with a Global Positioning System (GPS) 337 in order to determine to location of the mobile communication device 301. The antenna 338 may be a GPS receiver or otherwise include a GPS receiver. In various embodiments contemplated herein, communication with the mobile communication device 301 may be conducted with a single antenna configured for multiple purposes (e.g., cellular, GPS, etc.), or with further interfaces (e.g., three, four, or more separate interfaces).

The mobile communication device 301 can also include at least one computer-readable medium 346 coupled to the processor 336, which stores application programs and other computer code instructions for operating the device, such as an operating system (OS) 348. In some embodiments, the mobile application 351 may be stored in the memory 334 and/or computer-readable media 346. In some embodiments, the mobile application 351 may be stored on the SIM card 376. In some embodiments, mobile communication device 301 may have cryptographic capabilities to send encrypted communications and/or messages protected with message hash codes or authentication codes. Again, the example of mobile communication device 301 is non-limiting. Other devices, such as those addressed herein, may interact with the interaction infrastructure 102.

The mobile communication device 301 may access the network 108 through a wireless link to an access point. For example, a mobile communication device 301 may access the network 108 through one or more of access point 306(*a*), access point 306(*b*), access point 306(*c*), and/or any other suitable access point(s). The access points 306 may be of any suitable type or types. For example, an access point 306 may be a cellular base station, an access point for wireless local area network (e.g., a WiFi access point), an access point for wireless personal area network (e.g., a Bluetooth access point), etc. The access point 306 may connect the mobile communication device 301 to the network 108, which may include the Internet, an intranet, a local area network, a public switched telephone network (PSTN), private communication networks, etc. In some embodiments, access point(s) 306 may be used in obtaining location information for the mobile communication device 301, as described further herein.

Figure 3B:
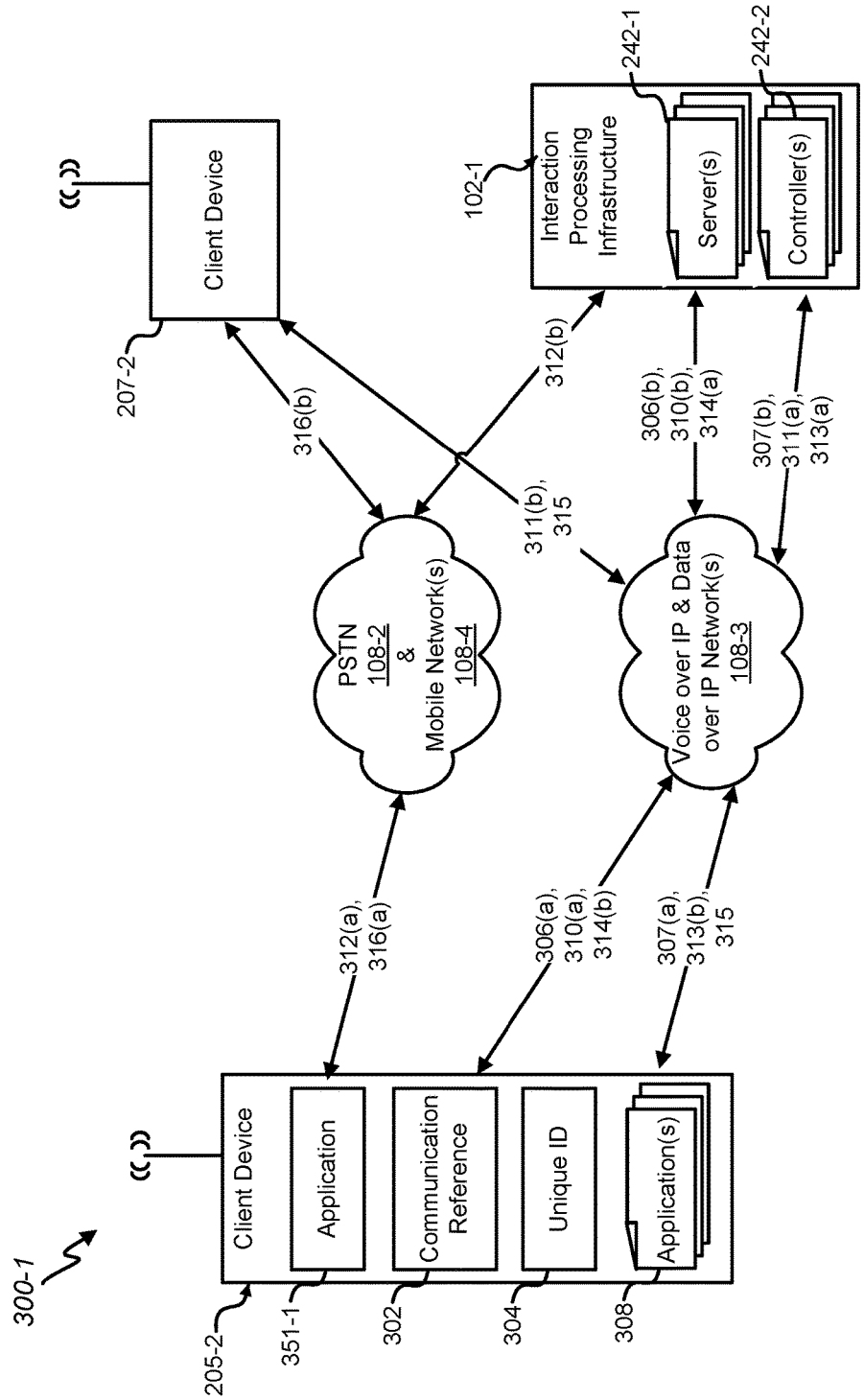
FIG. 3B depicts a high-level block diagram of a system for communication routing and tracking, in accordance with certain embodiments of the present disclosure.

FIG. 3B depicts a high-level block diagram of a system 300-1 for communication routing and tracking, in accordance with certain embodiments of the present disclosure. The client device 205 configured with the application 351-1 may be configured to associate the application 351-1 with a communication reference 302 of the client device 205. In some embodiments, the communication reference 302 is a telephone number associated with the client device 205. In some embodiments, the application 351-1 may gather the telephone number from the device, a carrier associated with device subscriber, or via input of the end-user. In some embodiments, the application 351-1 may register unique identification information 304 associated with the client device 205. For example without limitation, the application 351-1 may gather the information 304 from the client device 205. In some embodiments, unique identification information 304 may be gathered from a SIM card 376 or another card of the client device 205. In some embodiments, unique identification information 304 may be gathered from other components of the client device 205.

The unique identification information 304 may be sent by the client device 205 to the infrastructure 102. The unique identification information 304 could include any suitable subscriber identity information. In some embodiments, the unique identifier may include an IMSI. In some embodiments, the unique identifier may be derived from the IMSI such that the actual IMSI is not sent. In some embodiments, a hash code based on the IMSI may be sent. The unique identifier may indicate associated network location information in some embodiments.

In some embodiments, to provision tracking service, the client device 205 configured with the application 351-1 may send provisioning information to the infrastructure 102. The provisioning information may indicate communication reference information 302. For example without limitation, as indicated by interactions 306(*a*) and 306(*b*), the client device 205 may send phone number information to the infrastructure 102. In some embodiments, the provisioning information could be sent to a MSC/HLR, which could then convey the information to the infrastructure 102. In some embodiments, the provisioning information could be sent via SMS messaging, as indicated by interactions 312(*a*) and 312(*b*). For example without limitation, SMS messaging may be sent to the infrastructure 102 via one or more of a home carrier MSC, a home carrier SMSC, an intercarrier SMS gateway, serving carrier SMSC, a mobile network 108-4, a serving carrier MSC/VLR, and/or the like.

Provisioning could be initiated with launching/installing the application 351-1. The provisioning information may be sent to the infrastructure 102 via an Internet Protocol (IP) message via one or more IP networks, such as network(s) 108-3. In some embodiments, the provisioning information may include the subscriber's Mobile Directory Number (MDN) for CDMA networks or Mobile Subscriber Integrated Services Digital Network Number (MSISDN) for GSM networks. In some embodiments, the client device 205 configured with the application 351-1 may also send provisioning information that includes the device's unique equipment identity 304. When necessary, the infrastructure 102 could request the subscriber's unique subscriber identity from the home location register associated with the MDN or MSISDN. The infrastructure 102 may store the provisioning information in one or more data repositories 140. In some embodiments, after the infrastructure 102 receives the provisioning information, it may send a confirmation message to the application 351-1, as indicated by interfaces 314(a) and 314(b).

As discussed herein, in some embodiments, the infrastructure 102 may provide particularized content objects through the application 351-1. In some embodiments, particularized content objects may be displayed through the one or more additional applications 308 of the client device 205, such as a browser, an SMS application, a push notification, an email application, a social media application, etc. In some embodiments, the application 351-1 could include a toolkit with client-side utility for interfacing with the one or more additional applications to facilitate tracking and/or call handling responsive to presented particularized content objects. Various embodiments may present particularized content objects in any one or combination of ways. In some embodiments, the one or more additional applications 308 could include a toolkit for interfacing with the application 351-1. In some embodiments, the application 351-1 could be grafted into the one or more additional applications to provide tracking and/or call handling functionalities. In some embodiments, the application 351-1 could use one or more API translation profiles configured to allow interface with the one or more additional applications 308.

The end-user may select a user-selectable call option presented with the client device 205 responsive to a particularized content object presented via the client device 205 either via the application 351-1 or via another application, in accordance with various embodiments. In some embodiments, the user-selectable call option and the particularized content object may be integrated, for example without limitation, with a particularized content object with a click-to-call option. In some embodiments, responsive to the user selection, a call may be placed to a provider communication device 207, as indicated by interactions 316(a) and 316(b).

Responsive to the user selection, the client device 205 configured with the application 351-1 may send one or more communications corresponding to the particularized content object, via a data network, to the infrastructure 102, as indicated by interactions 310(a) and 310(b). By way of example without limitation, the one or more communications may include one or more IP messages sent via one or more IP networks, such as network(s) 108-3. The one or more messages may convey tracking information. The tracking information could indicate call information. By way of example without limitation, the call information could correspond to the telephone number, the subscriber identity, the device identification, the IMSI, and/or any suitable information associated with the client device 205.

In some embodiments, particularized content objects are presented to a user via the application 351-1 such that the application 351-1 is configured to gather tracking information about those particularized content objects. In some embodiments, calls are placed or at least initiated via the application 351-1 such that the application 351-1 is configured to gather tracking information about those calls. In some embodiments, the application 351-1 receives, pulls, extracts, and/or listens to information from one or more applications 308 of the client device 205 to gather tracking information, where particularized content objects are presented via the one or more applications 308 and/or calls are placed or at least initiated via the one or more applications 308. In some embodiments, tracking information may include call information gathered from a phone application 308 of the client device 205.

Figure 2B:
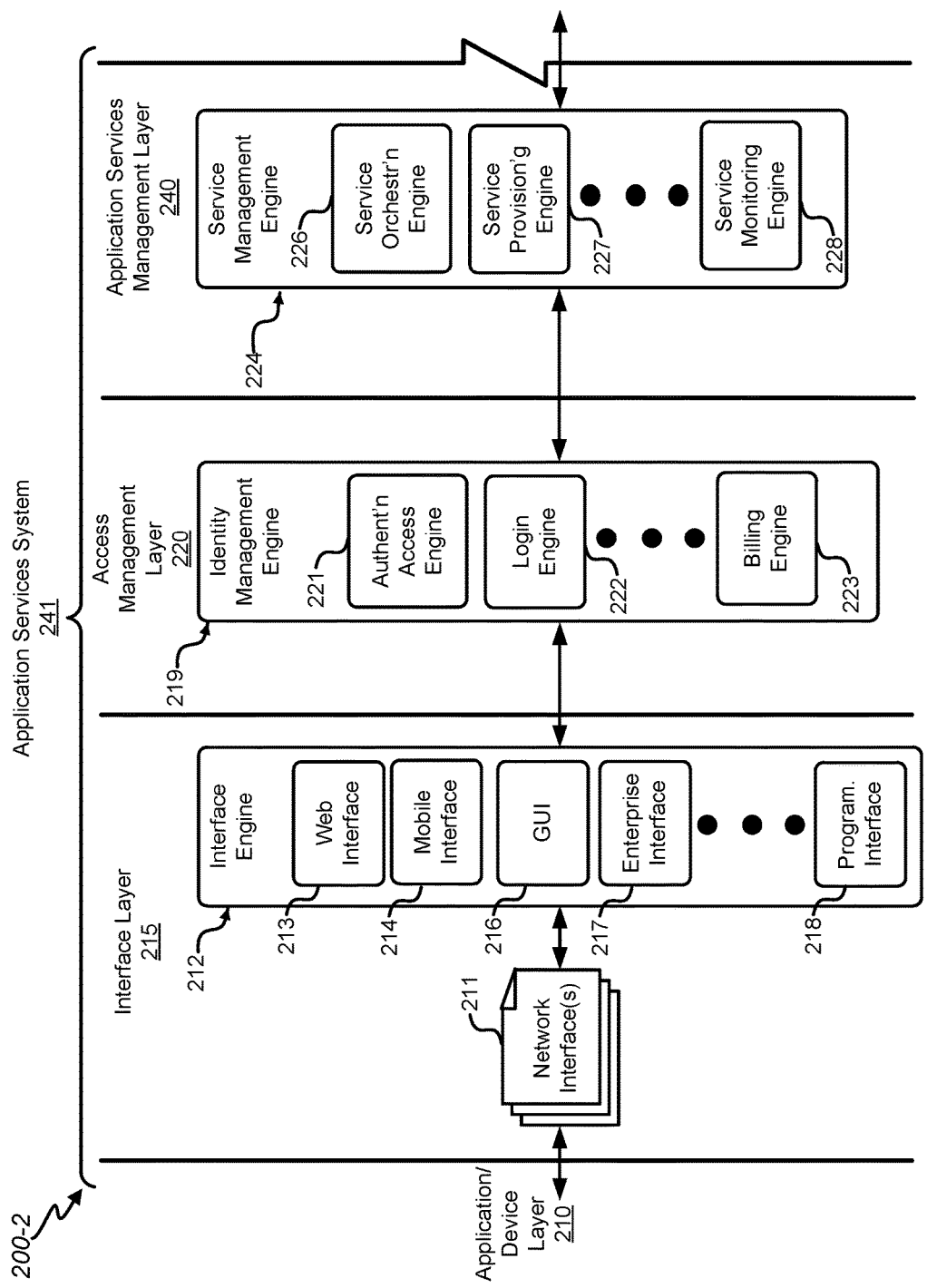

FIG. 2B shows a diagram of a portion 200-2 of the architecture stack 200 of the interaction infrastructure 102, in accordance with certain embodiments of the present disclosure. The portion 200-2 at least partially includes the interface layer 215, the access management layer 220, and the application services management layer 240. In some embodiments, the application services system 241 may correspond at least partially to the interface layer 215, the access management layer 220, and the application services management layer 240. While engines, repositories, and other components are described separately in this disclosure, it should be appreciated that the components may be combined and/or implemented differently in any combination to provide certain features in various embodiments. In various embodiments, different processes running on one or more shared resources may implement some of the components.

The interaction processing infrastructure 102 may include one or more network interfaces 211 communicatively coupled to one or more servers, which may include communication servers, web servers, gateways, application servers, database servers, and/or one or more other types of servers. The network interface(s) 211 may include any suitable input/output module or other system/device operable to serve as an interface between one or more components of the interaction infrastructure 102 and the network 108. The interaction infrastructure 102 may use the network interfaces 211 to communicate over the network 108 using any suitable transmission protocol and/or standard.

The interface layer 215 may include one or more interface engines 212. The interface engine 212 may be configured to generate one or more interfaces 105, 107, 111, 114 (e.g., web interfaces 213, mobile app interfaces 214, graphical user interfaces 216, enterprise application interfaces 217, programmatic interfaces 218, and/or the like) to enable data to flow to client devices 205, 207 via respective applications 206, 208. In various embodiments, the interfaces of interface engine 212 may be embodied in hardware and/or software. The interface engine 212 may include logic to send, present, and receive information, with one or more of the interfaces to/from one or more end users, service providers, and/or data sources. The interface engine 212 may utilize one or more network interfaces to transceive information through the network 108. The interaction infrastructure 102 may pull and/or push information from those entities.

Generally, interfaces may be configured to receive user input, present dynamic presentations that depend on user input, and otherwise respond to user input. In some examples, such input may be provided via one or more input devices (e.g., a keyboard, touchscreen, joystick, mouse, microphone, devices capable of capturing inputs, and the like) operated by one or more users of user devices. Output may be provided via one or more output devices 352 (e.g., a display or speaker). The web interfaces 213 and mobile interfaces 214 may include any suitable web interface and mobile interface configured to interact with elements of the interaction infrastructure 102. The graphical user interfaces 216 may include any suitable graphical user interface configured to interact with elements of the interaction infrastructure 102. The enterprise interface 217 may include internal interfaces for accessing element of the interaction infrastructure 102 via an internal network of an enterprise. The programmatic interfaces 218 may include one or a combination of an API, a programmatic user interface, and/or other similar interfaces for defining core functions for accessing elements of the interaction infrastructure 102. A programmatic interface 218, for example, may specify software components in terms of associated operations.

Elements of the interface layer 215, for example, the interface engine 212, may communicate with calls and inputs directed to and/or received from the access management layer 220. In some embodiments, the access management layer 220 may include one or more identity management engines 219. Generally, the identity management engine 219 can be configured to provide identity services, such as access management and authorization services for end users and/or providers serviced by the interaction infrastructure 102. In some embodiments, the identity management engine 219 may control information about end users and providers that utilize the services provided by the interaction infrastructure 102. The control information may include information that authenticates the identities of end users and/or providers and that specifies authorized actions with respect to various system resources and services.

In some embodiments, the identity management engine 219 may include logic for implementing account features in various embodiments. By way of example without limitation, the identity management engine 219 may include logic one or more aspects of: handling user registration; managing account creation, updates, authentication, handling; and/or the like. The identity management engine 219 may be configured for acquiring, processing, formatting, and/or storing authentication information in the one or more authentication information repositories 257.

In some embodiments, the identity management engine 219 may include a plurality of engines configured to manage different aspects of interacting with elements of the interaction infrastructure 102, such as user interactions with applications serviced by the interaction infrastructure 102. The engines may include, for example, an authentication access engine 221, a login engine 222, and a billing engine 223. The different engines of the identity management engine 219 can define routines, protocols, standards, and/or the like for interacting with elements of the interaction infrastructure 102. The authentication access engine 221 may evaluate rules and conditions under which users may access elements of the interaction infrastructure 102. These rules and conditions may be user-defined (e.g., by an administrator or reviewer), learned over time, and/or may be dynamically updated and/or evaluated based on characteristics of the user or the user's device attempting to access the interaction infrastructure 102. The login engine 222 may evaluate the rules and conditions under which users are able to log in to the interaction system or access applications associated with the interaction system. Thus, while authentication access engine 221 may evaluate the rules to determine which users may access the interaction infrastructure 102, the login engine 222 may evaluate the particular credentials, profiles, etc. associated with each authenticated user.

The application services management layer 240 may include one or more service management engines 224. The service management engines 224 may include one or more service orchestration engines 226, one or more service provisioning engines 227, and/or one or more service monitoring engines 228. By way of example without limitation, in some embodiments, a client device 205 or 207 running an application 206 or 208 may interact with the interaction infrastructure 102 by transmitting a service request 201 to the interaction infrastructure 102 for one or more services provided by the interaction infrastructure 102. In some embodiments, the service request 201 may be received via an interface facilitated by the interface engine 212. The service request 201 may be processed by the service management engine 224 and, consequent to the processing, information identifying one or more services and, in some embodiments, information uniquely identifying a user. The service orchestration engine 226 may utilize the information to orchestrate the provisioning of services and resources responsive to the service request 201. In some embodiments, the service orchestration engine 226 may orchestrate the provisioning of services and resources using the service provisioning engine 227. In certain embodiments, the service orchestration engine 226 may enable the management of processes associated with each service request 201 and may apply entity logic to determine whether and how a service 202 should be provisioned. The service orchestration engine 226 may send a request to the service provisioning engine 227 to prompt the service provisioning engine 227 to allocate resources and configure those resources needed for the service 202. The service 202 may be tracked by the service monitoring engine 228. In some instances, the service monitoring engine 228 may be configured to collect usage statistics for the services 202.

Figure 2C:
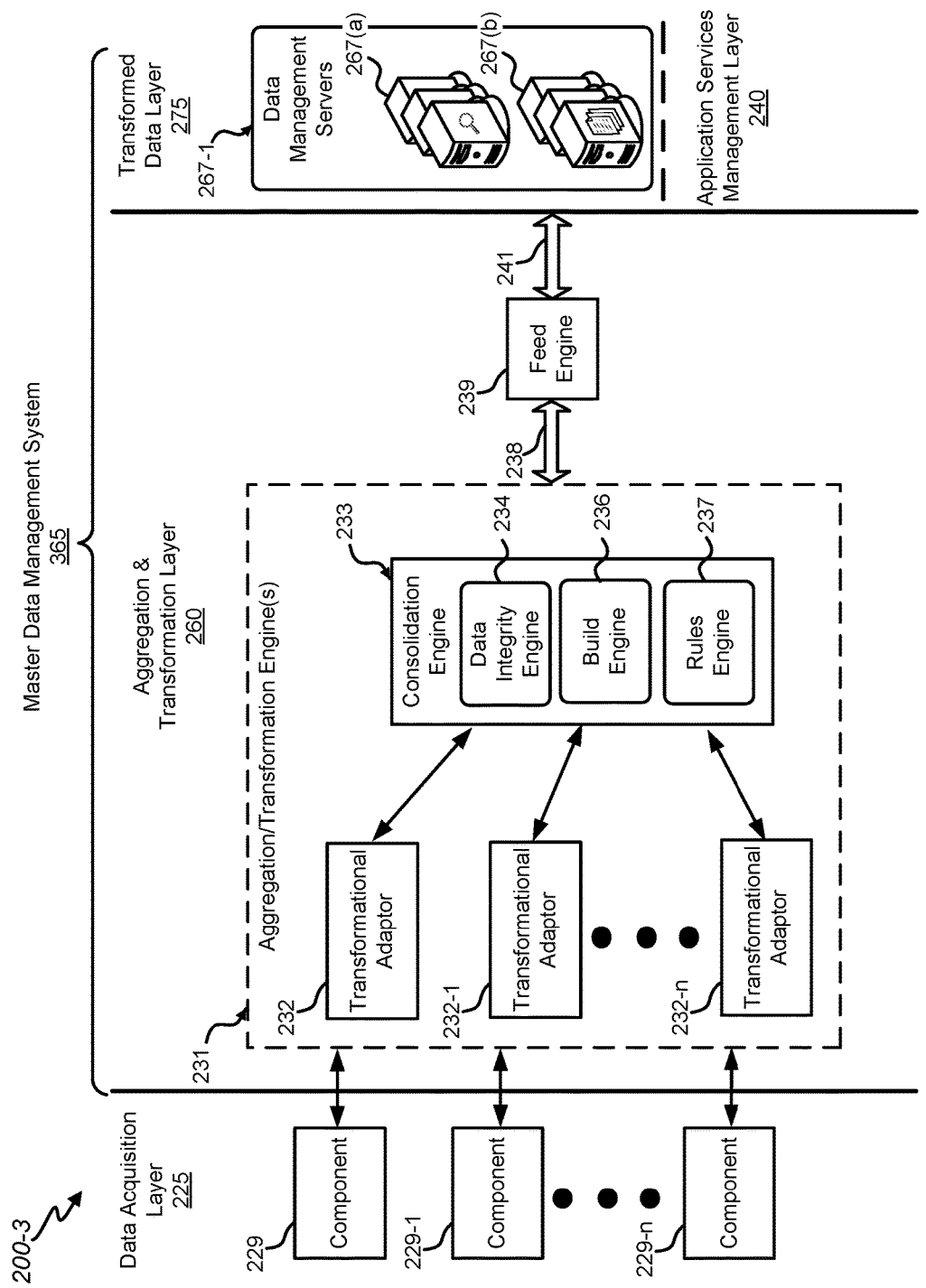

FIG. 2C shows a diagram of another portion 200-3 of the architecture stack 200 of the interaction infrastructure 102, in accordance with certain embodiments of the present disclosure. In particular, the portion 200-3 at least in partially includes the data acquisition layer 225, the aggregation and transformation layer 260, and the transformed data layer 275. The data acquisition layer 225 may receive data from components 229. In various embodiments, the components 229 may correspond to any one or combination of data sources disclosed herein and/or the like, with aggregation being facilitated in some embodiments with any one or combination of interfaces 105, 107, 111, 114 and/or client devices 205, 207. In some embodiments, the components 229 may include complimentary layers to facilitate data transmission, such as a transmission layer, generation layer, and/or a receiving layer to communicate and/or receive data via the data acquisition layer 225. In various embodiments, the input from the components 229 may correspond to any one or combination of raw data, unstructured data, structured data, information, and/or content which may include media content, text, documents, files, instructions, code, executable files, images, video, audio, and/or any other suitable content suitable for embodiments of the present disclosure. For example, data from 20, 200, or any number of different sources may be merged together with data generated internally, data previously received, data from third parties, etc. The data could relate to end users, providers, entities, geographic locations, demographic information, and/or the like. For example, the aggregation and transformation layer 260 may identify which data and records are about the same entity and may merge attributes from different sources into one composite object that can be used by the application services as a basis for services provided.

The aggregation and transformation layer 260 may provide a pipeline that processes data input from the components 229, applies rules, transforms the data, and feeds the transformed data to the transformed data layer 275 and/or the application services management layer 240. The aggregation and transformation layer 260 may include one or more aggregation and/or transformation engines 231. In various embodiments, the aggregation and/or transformation engine 231 may correspond to an integral engine or separate engines working in conjunction. The aggregation/transformation engine 231 may transform, translate, or otherwise adjust data collected. In some embodiments, two or more of the components 229 may generate data according to different formats. The data can then be transformed, translated, or otherwise adjusted by the engine 231. For example, acquired data may be converted from a first format to a second format using one or more conversion rules, which may be user-defined, heuristic, and/or machine-learned. In some embodiments, the transformation engine 231 may perform similar operations with respect to other data generated by elements of the interaction infrastructure 102.

In some embodiments, the aggregation and/or transformation engines 231 may include one or more transformational adaptors 232. In some embodiments, one or more transformational adaptors 232 may be associated with the components 229 to effect the transformations. The transformational adaptors 232 may be implemented, in various embodiments, in hardware and/or software. In some embodiments, a transformational adaptor 232 may include a hardware device and/or software component that transforms, translates, converts, or otherwise adjusts the acquired data. In various embodiments, the adjustment operations may be executed within the data acquisition layer 225 and/or the transformation layer 260.

A consolidation engine 233 may process manifold data sets that may, for instance, come from different sources or the same source, for example, by way of one or more updates to data previously provided by a particular source, and the consolidation engine 233 may consolidate the data sets to form a composite data set. The consolidation may include organizing, categorizing, qualifying, and/or comparing the sets of information; detecting, identifying, and/or handling errors/discrepancies; and/or otherwise processing the data sets. In some embodiments, the consolidation engine 233 may identify subset of entities that are more important than the rest, may process data to identify relations to at least one entity of the subset of entities, and may process data having such relation first. In some embodiments, the consolidation engine 233 may only consolidate the data having such relation and may disregard and/or dispose of data that does not possess such relation.

With certain embodiments, a data integrity engine 234 with one or more processors may check data sets to ensure quality of the data. The data integrity engine 234 may assess each piece of information relating to an aspect (e.g., data relating to a listing of information for an entity, such name, location, reviews, ratings, etc.) and may assign a weight to the information according to a score. Any suitable scoring system may be used. Missing information, for example, could have a lower score than non-missing information; and the missing information could be scored even lower, the more important the information is to the aspect. Information may be weighted according to the source. For example, in some instances, information relating to a company that is gathered from the company's website may be weighted higher or lower relative to information gathered from a third party's website; tracking data gathered from an end-user device, for example, may be considered more reliable than corresponding/conflicting information from a third party directory service. Scoring profiles (e.g., compiled for end users, providers, entities, etc.) based the information based upon the underlying reliability of information may avoid provisioning of misdirected, redundant, unwanted, and/or unnecessary services.

In certain embodiments, the data integrity engine 234 may examine items of information and assign scores according to how important such information is to services, generally. The data integrity engine 234 may take into account service categories. Data pertinent to service categories may be prepared as a basis for provisioning services corresponding to particular categories. In certain embodiments, the data integrity engine 234 may adjust scoring of information in view of a specific services and/or specific categories of services. In certain embodiments, the data integrity engine 234 may examine items of information in view of a specific services and/or specific categories of services upfront, thereby rendering subsequent readjustment unnecessary. Based on the scoring, certain data may be discarded or flagged for possible follow-up and/or prompting for further information and/or clarifying information may be identified, generated, and/or provided. Accordingly, composite content can be made more reliably with possible follow-up and/or prompting for a data source to link to for more missing information.

In various embodiments, a rules engine 237 may be configured to create and manage entity rules, condition-response rules, alert/reports rules, data-formatting rules, data-sharing rules, transmission rules, aggregation rules, user authorization rules, and other similar rules. Such rules may be user-defined, fixed, heuristics, learned by elements of the interaction infrastructure 102, and any combination of the foregoing. In some embodiments, the rules engine 237 may be included in the consolidation engine 233. In some embodiments, the rules engine 237 may be separate from the consolidation engine 233.

A build engine 236 may assess quality of the data and/or the data sources. The build engine 236 may build one best data set that relates to a particular entity. In some embodiments, the build engine 236 may build multiple high-quality data sets that relate to a particular entity, but are tailored for different purposes (e.g., different locations, publisher channels, medial channels, and/or the like).

A feed engine 239 may be configured to process received input 238 from the aggregation/transformation engine 231. In some embodiments, the feed engine 239 may be integral with the aggregation/transformation engine 231. The feed engine 239 may generate one or more feeds 241 transferred to the transformed data layer 275 (e.g., for storage) and/or the application services management layer 240 (e.g., for more immediate use, by the publication management layer 255 or another application service). In some embodiments, the feed engine 239 may generate a single feeder 241—a universal feed object—to feed the transformed data layer 275 and/or the application services management layer 240. The feed engine 239 may feed transformed data (which may include transformed information and/or transformed content in some embodiments).

In some embodiments, the feed engine 239 may implement a feeding process that feeds transformed data (which may include information and/or content in some embodiments) based on a last finishing point of a previous feeding process. The feed engine 239, in some embodiments, may push the transformed data/content/information into one or more temporary indexes. In some embodiments, the feed engine 239 may further transform the transformed data/content/information into a feed object with a data-interchange format that facilitates parsing. The feed engine 239 and/or the aggregation/transformation engine 231 may translate the data into understandable data, information, and/or content. The transformed data, information, and/or content may be directed to certain tables and/or data stores 268 based on the type of and/or an entity category to which the data, information, and/or content relates. For example, in some embodiments, the master data management system 265 may manages provider content and feeds into search indexes and the publishing system.

The feeding process may include multiple processes, in some embodiments. For example, the feed engine 239 may spin out two processes: one process for communicating with a search server system 267(a); and one process for communicating with a document server system 267(b). The search server system 267(a) and/or the document server system 267(b) may process the temporary index and determine which data is absent from the data stores 268. Consequent to determining which data is needed, the data may be fed to the data stores 268.

In some embodiments, the data may be feed to the search server system 267(a) and/or the document server system 267(b) on a periodic basis (e.g., every 15 minutes or any other time period). The search server system 267(a), in some embodiments, may only retain in its search indexes information needed for retrieving content objects (e.g., documents) and ranking the content objects. Thus, with such embodiments, other information not necessary for retrieval and ranking (e.g., images corresponding to an entity). The document server system 267(b) may have every entity attribute indexed for information retrieval. This bifurcation may allow for the interaction infrastructure 102 to perform super-fast retrieval. The search server system 267(a), in some embodiments, may perform matching, sorting, and/or the like, and hence may be CPU heavy. The document server system 267(b), in some embodiments, may be a disk I/O intense system and can handle those kinds of loads.

Figure 5:
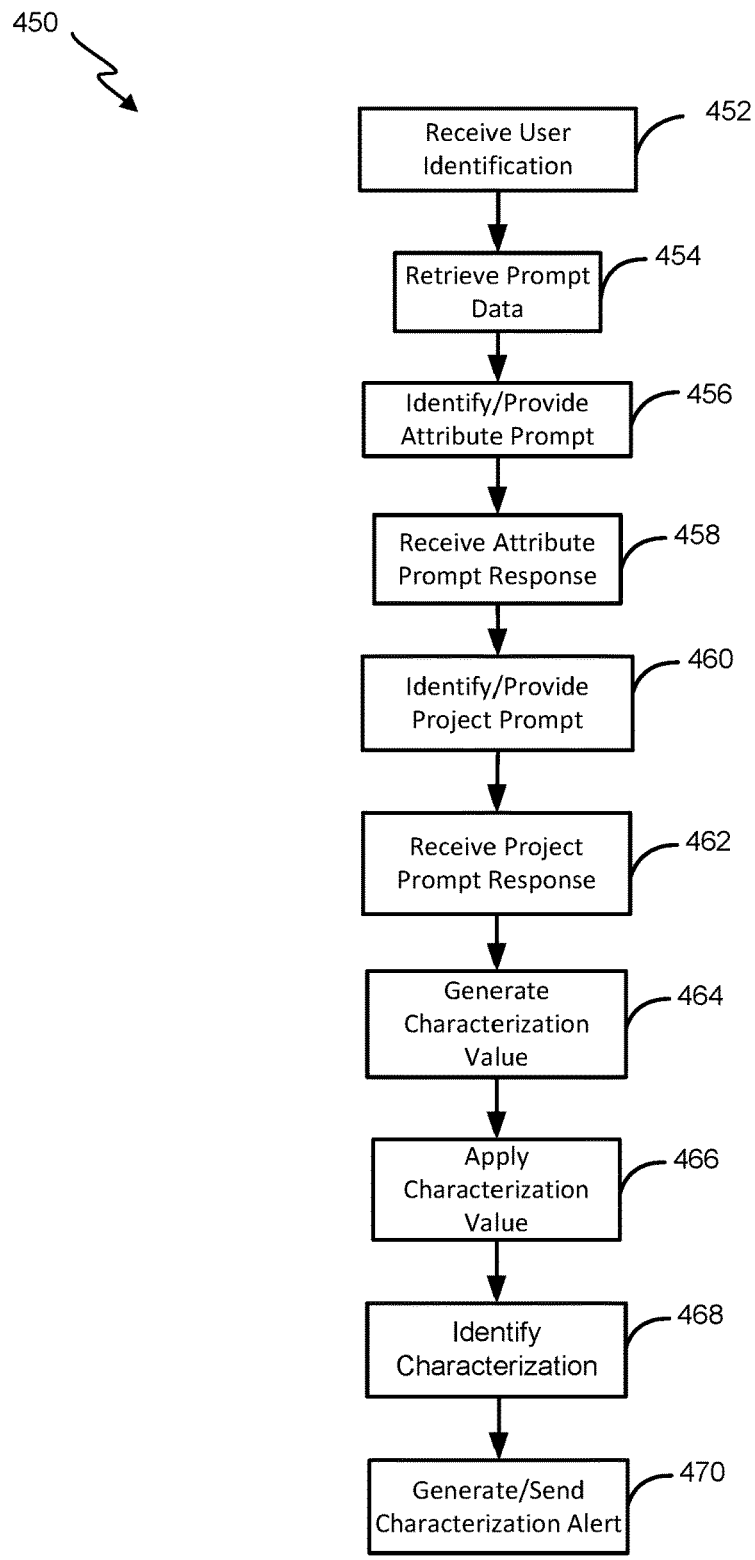
FIG. 5 is a flowchart illustrating one embodiment of a process for intaking a user.

With reference now to FIG. 5, a flowchart illustrating one embodiment of a process 450 generating and sending a characterization alert is shown. In some embodiments, the process 450 can be performed by, for example, one of the servers of the server systems 242, 267. In some embodiments, the characterization alert can be generated and/or sent as part of the intake of a user. In some embodiments, the generating and sending of a characterization alert can be based on the generation of a characterization value which can identify one or several attributes of the user. In some embodiments, the process 450 can be used for intaking a consumer, and in some embodiments, the process 450 can be used for intaking the pro. The process 450 begins at block 452 wherein user identification information is received. In some embodiments, this information can include, for example, a username and a password, or the like. In some embodiments, this information can identify a new user that does not currently have a user profile such as, for example, a consumer profile or a pro profile. If the user identification information identifies a new user, then a new user account is created and the process 450 proceeds to block 454 wherein question data is retrieved. In some embodiments, the question data can be retrieved from one of the databases 400 of the database server 104 such as, for example, the question database 406.

After the question data has been retrieved, the process 450 proceeds to block 456 wherein one or several attribute prompts are identified and/or provided to the user via, for example one of the user devices 205, 207. In some embodiments, an attribute prompt can comprise one or several questions directed at the user and/or past user behavior. In some embodiments, the one or several attribute prompts can be used to generate data to identify one or several personality related attributes of the user such as, for example, a personality type, a preferred working style, preferred interaction style, or the like. In some embodiments, one or several attribute questions can be retrieved from, for example, the character database 410.

Additionally, in some embodiments, one or several attribute questions can relate to one or several style preferences and/or styles of the user. These can include, for example, questions relating to preferred colors and/or color schemes, questions relating to liked and/or disliked architectural or interior design styles, liked and/or disliked furnishings, or the like. In some such embodiments, the one or several attribute questions can be retrieved from the style database 408.

After the attribute prompts are identified, the process 450 proceeds to block 458 wherein attribute prompt responses are received. In some embodiments, and in response to the receipt of the attribute prompts, the user can provide one or several responses to the one or several attribute prompts in the form of inputs to the user device 205, 207. These inputs and/or the data from those inputs can be provided from the user device 205, 207 to one of the servers of the server systems 242, 267.

After the attribute prompt responses have been received, the process 450 proceeds to block 460 wherein one or several project prompts are identified and/or provided. In some embodiments, these one or several project prompts can be identified in and retrieved from the databases 400, and specifically from the project database 412. In some embodiments, the project prompts can be provided to the user via the user device 205, 207. In some embodiments, the project prompts can relate to aspects of the desired project such as, for example, the size of project, the budget for the project, desired starting and/or stopping time for the project, the desired duration of the project, location of the desired project, or the like.

After the project prompts have been identified and provided, the process 450 proceeds to block 462 wherein the project prompt responses are received. In some embodiments, and in response to the receipt of the project prompts, the user can provide one or several responses to the one or several project prompts in the form of inputs to the user device 205, 207. These inputs and/or the data from those inputs can be provided from the user device 205, 207 to one of the servers of the server systems 242, 267.

After the project prompt responses have been received, the process 450 proceeds to block 464 wherein a characterization value is generated. In some embodiments, the characterization value can be generated based on answers received in response to one or several of the attribute questions and/or one or several of the project questions. Thus, in some embodiments, the characterization value can comprise a first component relating to one or several consumer attributes and a second component relating to one or several project attributes. In some embodiments, a weighting and/or scoring algorithm can be applied to these answers and can be used to determine the characterization value. In some embodiments, generation of the characterization value can include selecting and retrieving a prompt response; identifying a weighting value applicable to the selected prompt response; and applying the weighting value to the prompt response to generate a weighted prompt response value. In some embodiments, the generation of the characterization value can further include determining if a desired some, or all of the prompt response have been selected; and generating a characterization value from the weighted prompt response values if the desired some, or all of the prompt responses have been selected, or repeating the above identified steps until all of the prompt responses have been selected. In some embodiments, one of the servers of the server systems 242, 267 can generate the characterization value.

After the characterization value has been generated, the process 450 proceeds to block 466 wherein the characterization value is applied to the user profile. In some embodiments, this can include updating one of the databases 400, and specifically can include updating one of the consumer database 402 and the pro database 404.

After the characterization value has been applied to the user profile, the process 450 proceeds to block 468 wherein the characterization associated with the characterization value is identified. In some embodiments, for example, this can include comparing the calculated characterization value to one or several values from, for example, a lookup table. In such an embodiment, a characterization can be identified as the characterization having an associated value closest to the calculated characterization value. After the characterization has been identified, the process 450 proceeds block 470 wherein a characterization alert is generated and sent. In some embodiments, the characterization alert can comprise data identifying the characterization of the user and/or the characterization value and computer code configured to activate the user device 205, 207 when the alert is received. In some embodiments, the characterization alert can be further configured to direct and/or cause the user device 205, 207 to provide and/or display the characterization and/or characterization value to the user.

Figure 6:
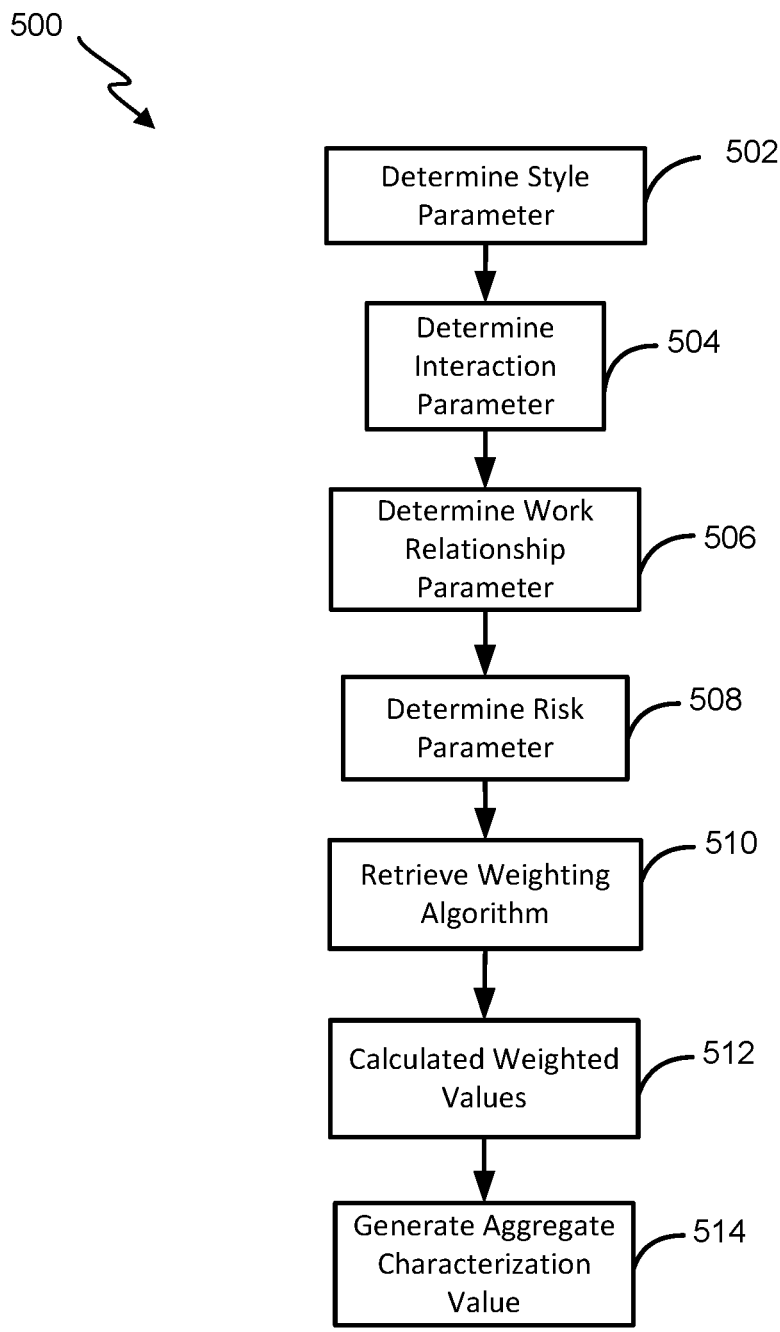
FIG. 6 is a flowchart illustrating one embodiment of a process for determining a characterization value of a consumer.

With reference now to FIG. 6, a flowchart illustrating one embodiment of a process 500 for determining a characterization value is shown. In some embodiments, the process can be performed as part of, or in the place of block 464 of FIG. 5.

The process 500 begins at block 502 wherein a preferred style parameter is determined. In some embodiments, this can include the presentation of one or several images, pictures, videos, or the like to the consumer, and prompting the consumer to select a preferred one or more of the presented one or several images, pictures, videos, or the like. In some embodiments, the consumer provided selections can be used to identify a preferred style parameter. In some embodiments, the preferred style parameter can be identified, within a server of one of the server systems 242, 267 by a value, which can be, for example, one or several values between 0 and 1, one or several binary values, or any other value.

After a preferred style parameter has been determined, the process 500 proceeds block 504 wherein an interactive style parameter of the consumer is determined. In some embodiments, this can include determining the parameter characterizing: the personality of the consumer; how the consumer prefers to communicate; preferred relationship types for the consumer; and/or the like. In some embodiments, this determination can include presenting one or several questions to the consumer and receiving answers from the consumer to these questions. The data from these answers can be used to identify where several preferred interactive styles of the consumer.

After the preferred interactive style parameter is determined, the process 500 proceeds to block 506 wherein one or several work relationship parameters for the consumer are determined. In some embodiments, one or several work relationship parameters, also referred to herein as work relationship styles, can identify a consumer preference for structuring a work relationship. This can include, for example, a preference for formality versus informality in the work relationship, a preference for written versus oral communication, or the like. In some embodiments, this determination can include presenting one or several questions to the consumer and receiving answers from the consumer to these questions. The data from these answers can be used to identify one or several preferred work relationship styles of the consumer.

After the preferred work relationship parameter of the consumer is determined, the process 500 proceeds to block 508, wherein the consumer risk tolerance, also referred to herein as the consumer risk parameter, is determined. In some embodiments, the consumer risk parameter can comprise a numerical indicator, such as a binary numerical indicator that identifies how the consumer values the risk of, for example, completing a project late and/or over-budget versus other attributes of a provider, such as, for example, artistic prowess, social responsibility, or the like. In some embodiments, this determination can include presenting one or several questions to the consumer and receiving answers from the consumer to these questions. The data from these answers can be used to identify the consumer risk tolerance. In some embodiments, the parameters of blocks 502 to 508 can be based on the attribute prompt responses received in block 458 of FIG. 5.

After the consumer risk tolerance is determined, the process 500 proceeds to block 510 wherein the weighting algorithm is retrieved. In some embodiments, the weighting algorithm can be retrieved from one of the databases 400 of the database server 104. The weighting algorithm can be used to apply a weight to answers and/or to one or several categories of answers. After the weighting algorithm has been received, the process 500 proceeds block 512 wherein weighted individual values are calculated. In some embodiments, a weighted individual value is calculated for at least one of the preferred style, the preferred interactive style, the preferred work relationship style, and the risk tolerance. In some embodiments, one or several individual values can be calculated from the one or several project prompt responses received in block 462 of FIG. 5.

After the weighted individual values have been calculated, the process 500 proceeds to block 514 wherein an aggregate consumer characterization value is generated. In some embodiments, the aggregate consumer characterization value can be based off of the calculated individual weighted values. The aggregate consumer characterization value can be stored in one of the databases 400 and/or can be used to update the consumer profile stored in the consumer database 402.

Figure 7:
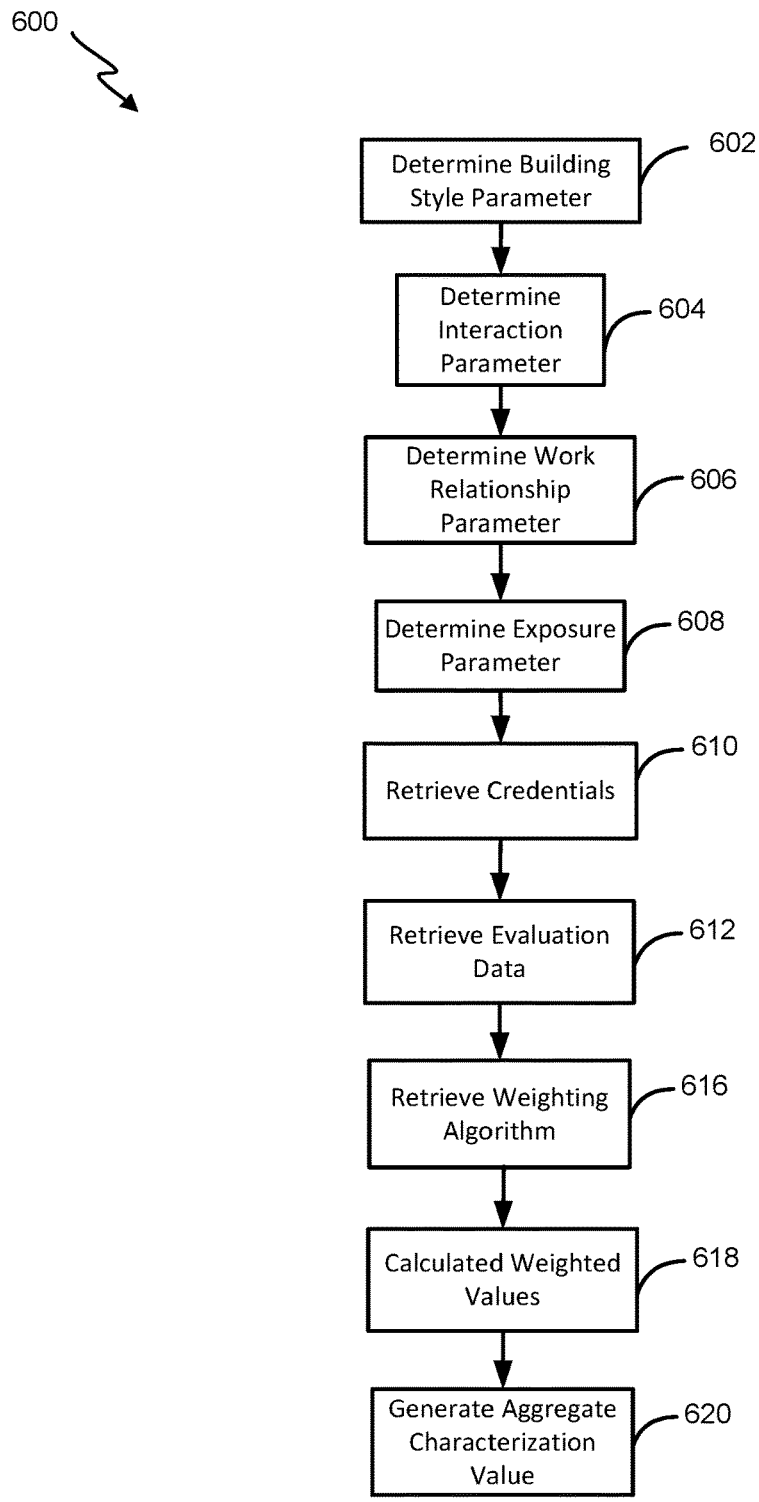
FIG. 7 is a flowchart illustrating one embodiment of a process for generating a provider characterization value.

With reference now to FIG. 7, flowchart illustrating one embodiment of a process 600 for generating a pro characterization value is shown. In some embodiments, the process can be performed as part of, or in the place of block 464 of FIG. 5.

The process 600 begins at block 602 wherein the pro's building style parameter is determined. In some embodiments, this can include the presentation of one or several images, pictures, videos, or the like to the pro, and prompting the pro to select a preferred one or more of the presented one or several images, pictures, videos, or the like. In some embodiments, the pro provided selections can be used to identify a preferred style. Alternatively, in some embodiments, the pro can provide one or several photos and/or images of one or several projects completed by the pro, and these one or several photos and/or images can be evaluated to identify a common building style. This common building style can be used to generate a building style parameter by identifying a numeric value associated with each style and associating that numeric value with the provider.

After the building style parameter has been determined, the process 600 proceeds to block 604 wherein an interactive style parameter, also referred to herein as the interaction parameter, of the pro is determined. In some embodiments, this can include determining a parameter indicative of: the personality of the pro; how the pro prefers to communicate; preferred relationship types for the pro; and/or the like. In some embodiments, this determination can include presenting one or several questions to the pro and receiving answers from the pro to these questions. The data from these answers can be used to identify one or several preferred interactive styles of the pro. In some embodiments, these one or several styles can be used to generate interactive style parameter by identifying a numeric value associated with each interactive style and associating that numeric value with the provider.

After the preferred interactive style parameter is determined, the process 600 proceeds to block 606 wherein one or several work relationship style parameters for the pro are determined. In some embodiments, one or several work relationship style parameters, also referred to herein as work relationship parameters, can identify a pro preference for structuring a work relationship. This can include, for example, a preference for formality versus informality in the work relationship, a preference for written versus oral communication, or the like. In some embodiments, this determination can include presenting one or several questions to the pro and receiving answers from the pro to these questions. The data from these answers can be used to identify one or several preferred work relationship styles of the pro, which one or several work relationship styles can be associated with one or several numeric values, such as, for example, one or several binary values, one or several values between 0 and 1, and/or any other desired value(s). In some embodiments, these one or several values can comprise the work relationship style parameter(s).

After the pro work relationship style parameter(s) has been determined, the process 600 proceeds to block 608 wherein the pro's risk exposure parameter, also referred to herein as the pros exposure parameter, is determined. In some embodiments, this determination can include, for example, an evaluation of events in one or several risk creating events in the pro's previous projects. These events can include, for example, failure to complete the project on budget, on time, and/or to satisfy the consumer. In some embodiments, the exposure parameter can comprise a count indicative of the number of risk events in past projects, and in some embodiments, the risk parameter can comprise a value indicative of the number and magnitude of risk events in past projects.

After the pro risk exposure parameter is determined, the process 600 proceeds to block 610 wherein credentials for the pro are retrieved. In some embodiments these credentials can be retrieved from a credentialing organization such as, for example: a state, local, and/or national government; a credentialing organization; a trade and/or professional group; or the like. In some embodiments, these credentials can be automatically retrieved by determining the type of credentials for the pro by, for example: determining the type of services provided by the pro; determining the credentialing organization or entity based on the location of the pro as determined from the pro's user profile or location information for the pro's user device 207; and automatically requesting the credentials from the credentialing organization or entity.

After the pro's credentials have been retrieved, the process 600 proceeds to block 612 wherein evaluation data for the pro is retrieved. In some embodiments, this information can be retrieved from one or several data sources including, for example, one or several consumer complaints and/or evaluations, a consumer protection and/or advocacy groups such as, for example, the Better Business Bureau, or the like. In some embodiments, this retrieval can be automatically performed by one of the servers of the server systems 424, 267, and in some embodiments, this retrieval can be facilitated by location information generated by the pro's user device 207.

After the evaluation data has been retrieved, the process 600 proceeds to block 616 wherein the weighting algorithm is retrieved. In some embodiments, the weighting algorithm can be retrieved from one of the databases 400. The weighting algorithm can be used to apply a weight to parameters and/or to one or several categories of parameters. After the weighting algorithm has been received, the process 600 proceeds to block 618 wherein weighted individual values are calculated. In some embodiments, a weighted individual value is calculated for some or all of the parameters determined in block 602-608, and in some embodiments, a weighted individual value is generated for at least one of the preferred style parameter, the preferred interactive style parameter, the preferred work relationship style parameter, and the exposure parameter. In some embodiments, the weighted individual values comprise a first component characterizing a pro attribute and a second component characterizing a completed project attribute.

After the weighted individual values are calculated, the process 600 proceeds to block 620 wherein an aggregate pro characterization value, also referred to herein as an aggregate contractor characterization value, is generated. In some embodiments, the aggregate pro characterization value can be based off of the calculated individual weighted values. The aggregate pro characterization value can be stored in one of the databases 400 and/or can be used to update the consumer profile stored in the pro database 402.

Figure 8:
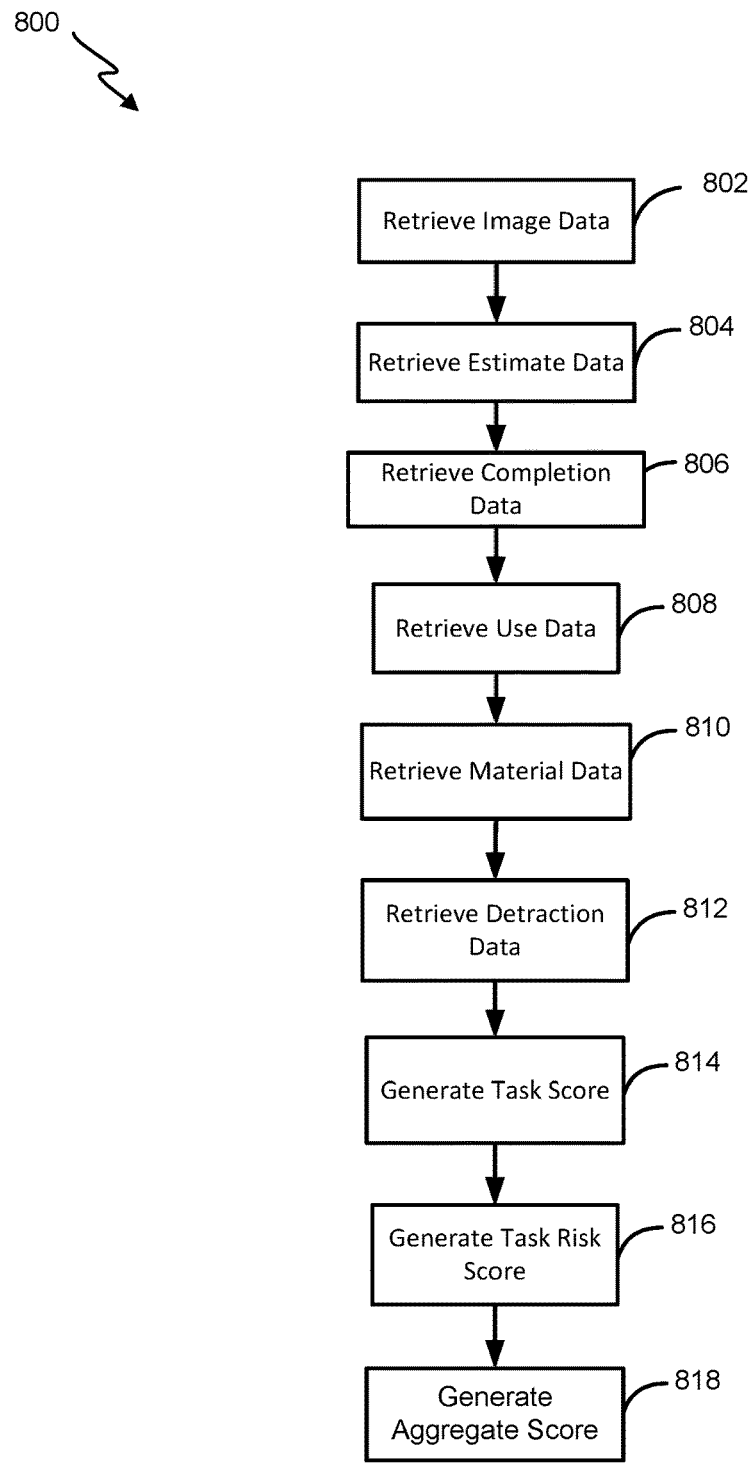
FIG. 8 is a flowchart illustrating one embodiment of a process for generating a project score.

With reference now to FIG. 8, a flowchart illustrating one embodiment of a process 700 for generating a project score is shown. The process 700 begins at block 702 wherein image data is retrieved. In some embodiments, the image data can contain image and/or picture data for one or several previously complete projects. In some embodiments, these one or several projects can be completed by a single provider, and in some embodiments, these one or several projects can be completed by multiple providers. In some embodiments, the image data can be stored in one of the databases 400 such as, for example, pro database 404.

After the image data has been retrieved, the process 800 proceeds block 804 wherein estimate data is retrieved. In some embodiments, the estimate data can comprise information identifying the estimate cost associated with one or several previously completed tasks, or currently completed tasks of one or several providers. The estimate data can be based off of information received from the provider user device 207, and/or received from one of the databases 400 such as the project database 412.

After the estimate data has been retrieved, the process 800 proceeds to block 806 wherein completion data is retrieved. In some embodiments, the completion data can identify the end cost of completion of the one or several tasks. This estimate data can be retrieved from the provider user device 207, and/or received form one of the databases 400 such as the project database 412.

After the completion data has been retrieved, the process 800 proceeds to block 808 wherein use data is collected. The use data can identify one or several sub-providers used by the one or several providers in completing previous projects. Use data can further identify frequency of use, cost of use, credentialing and/or compliance issues relating to the use of the sub-providers, or the like. This information can be stored in one the databases such as, for example, the pro database 404 or the resource database 416.

After the use data has been retrieved, process 800 proceeds to block 810 wherein material data is retrieved. In some embodiments, the material data can identify the amount, type, source including, for example, national and/or regional origin, and/or cost of materials used in the completion of the past project. The material data can be retrieved from one of the databases 800 such as, for example, the pro database 804 and/or the resource database 816.

After the material data has been retrieved, process 800 proceeds to block 812 wherein detraction data is retrieved. In some embodiments, the detraction data can be associated with negative feedback relating to previous tasks in which the provider was involved. In some embodiments, this detraction data can be specific to the provider, and in some embodiments, this detraction data can be general to a project, a group of providers, or the like. The detraction data can be retrieved from one of the databases 400 such as, for example, the provider database 404 and/or the project database 412.

After the detraction data has been retrieved, the process 800 proceeds to block 814 wherein a tasks score is generated. In some embodiments, this task score can be a numerical value indicating a success-rate achieved by the provider in completing one or several past tasks and/or the prowess demonstrated by the provider in the completing of those one or several past tasks. In some embodiments, the tasks score can further include a style component and indicates the preferred style and/or most successful style of the provider.

After the task score is generated, the process 800 proceeds to block 816 wherein a task risk score is generated. In some embodiments, the task risk score characterizes the likelihood of an adverse outcome occurring during tasks completion. This score can comprise a numerical value and/or a level identifier. This score can include, for example, a component indicating the rate at which the provider successfully completes tasks and/or unsuccessfully completes tasks, the likelihood of a deviation from tasks plan such as, for example, the likelihood of one or several change orders, the likelihood of exceeding estimate data levels, the likelihood of delayed task completion, or the like. In some embodiments, the task risk score can be generated based on information received from the provider user device 207 and/or retrieve from one of the databases 400 such as the pro database 404.

After the task risk score has been generated, the process 800 proceeds to block 818 wherein an aggregate task score is generated. In some embodiments, this aggregate task score can be generated by combining the task score calculated in block 814 and the task risk score calculated in block 816. In some embodiments, this combination can be performed according to a weighting algorithm and/or combination algorithm. In some embodiments, for example, a first weighting value can be retrieved for weighting the task score and a second weighting value can be retrieved for weighting the task risk score; the task score can be weighted according to the first weighting value and the task risk score can be weighted according to the second weighting value; and the weighted task score and the weighted task risk score can be combined to generate the aggregate task score.

Figure 9:
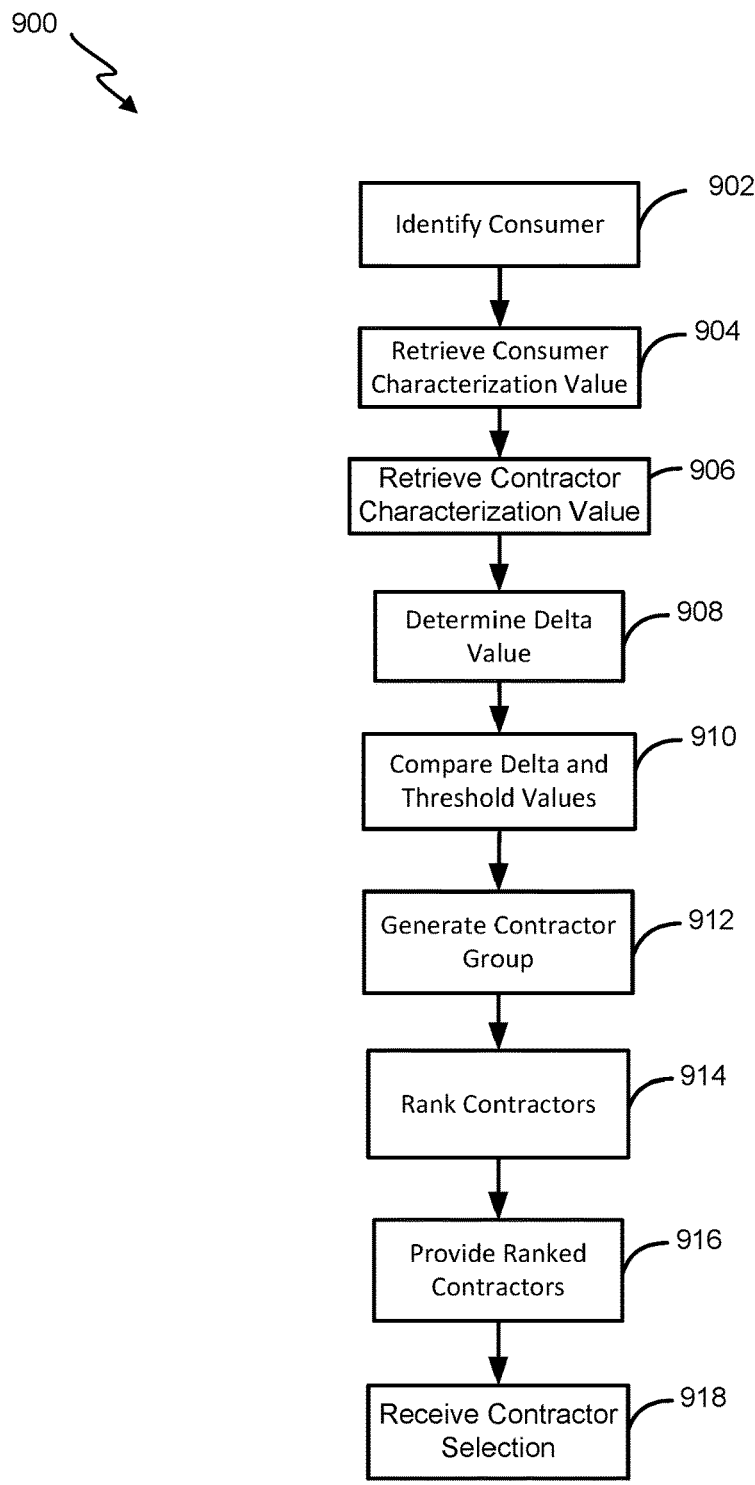
FIG. 9 is a flowchart illustrating one embodiment of a process for pairing a pro and a consumer.

With reference now to FIG. 9, a flowchart illustrating one embodiment of a process 900 paring a consumer and a pro is shown. In some embodiments, the process 900 can be performed by, for example, one of the servers of the server systems 242, 267. The process 900 begins at block 902 wherein a consumer is identified. In some embodiments, a consumer can be identified by consumer data received during user login into a consumer account via, for example, a username and a password.

After the consumer has been identified, the process 900 proceeds to block 904 wherein the consumer characterization value is retrieved. The consumer characterization value can be generated according to process 500 shown in FIG. 5. In some embodiments, the consumer characterization value is retrieved from one of the databases 400 such as, for example, the consumer database 402. This characterization value can, in some embodiments, characterize one or several attributes of the consumer's personality, values, value expectations, or the like.

After the consumer characterization value has been retrieved, the process 900 proceeds to block 906 wherein the pro characterization value is retrieved. In some embodiments, this can include retrieving a plurality of pro characterization values. The pro characterization value can be generated according to the process 600 shown in FIG. 7. This characterization value can, in some embodiments, characterize one or several attributes of the pro's personality, values, value expectations, or the like. The pro characterization value can be retrieved from one of the databases 400 such as, for example, the pro database 404.

After the pro characterization value has been retrieved, the process 900 proceeds to block 908 wherein a delta value is generated for some or all of the retrieved pro characterization values. In some embodiments, the delta value can be generated by determining the difference between a pro characterization value and a user characterization value. In some embodiments, the delta value can be calculated by determining the difference between the first component of the user characterization value and the first component of the pro characterization value, and the difference between the second component of the user characterization value and the second component of the pro characterization value. In some embodiments, this can include repeatedly comparing one pro characterization value to the consumer characterization value for the identified consumer until delta values have been generated for a desired some, or all of the pro characterization values. In such an embodiment, the smaller the difference between one of the pro characterization values and the consumer characterization value, the closer the match between the consumer and the pro and the higher the likelihood of successful and satisfactory completion of the project. In effect, this can include determining the degree of compatibility between the consumer and the pro on the basis of personality, values, value expectations, and/or the like.

After the delta value(s) has been determined, the process 900 proceeds to block 910 wherein the delta value(s) is compared to a threshold value. In some embodiments, for example, the consumer can be provided with one or several pros that most closely match the consumer, and other embodiments, the consumer can be provided with one or several pros whose pro characterization values most closely match the consumer characterization value and that have a difference that is less than a threshold value. In such an embodiment, the threshold value can be retrieved from one of the databases 400 such as, for example, from the prompt database 406 and the delta values can be compared to that threshold.

After the delta values are compared to the threshold level, the process 900 proceeds to block 912, wherein a pro group is generated. In some embodiments, this pro group can be generated based on the comparison of the delta values to the threshold value. In such an embodiment, a pro can be identified as belonging to the pro group when the delta value associated with that pro is less than the threshold value, and a pro can be identified as not belonging to the pro group when the delta value associated with that pro is greater than the threshold value.

After the set of pros is generated, the process 900 proceeds to block 914 wherein the pros in the pro group are ranked. In some embodiments, the pros in the set of pros are ranked according to the size of their associated delta value. In one such exemplary embodiment, the pros can be ranked from the greatest delta value to the smallest delta value.

After the pros in the pro group have been ranked, the process 900 proceeds to block 916 wherein the ranked pros are provided to the consumer. In some embodiments, the ranked pros can be provided to the consumer via one or several of the user devices 114. In some embodiments, the ranked pros can be provided to the consumer via an alert, also referred to herein as a pairing alert, which can be generated and sent from one of the servers of the server systems 242, 267. In some embodiments, this alert can activate the consumer device 205 and can automatically display and/or provide the ranked pros to the consumer according to the rank order of the ranked pros. In some embodiments, the providing of the ranked pros to the consumer can further include the generation and sending of alerts, referred to herein as potential alerts, to the pros in the pro group. In some embodiments, this alert can activate the pro device 207 and display, in some embodiments, anonymized, consumer information and/or project information to the pros.

After the ranked pros have been provided to the consumer, the process 900 proceeds to block 918 wherein a pro selection is received. In some embodiments, the pro selection can be received via one of the user devices 114 and can be provided to the application server 102.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. a consumer user device comprising:
   a wireless communications interface configured to communicate through a cellular network or through Wi-Fi;
   an input element configured to allow a consumer user to input information into the consumer user device; and
   an output element configured to provide the consumer user with information from the consumer user device;
   a provider user device comprising:
   a wireless communications interface configured to communicate through a cellular network or through Wi-Fi;
   an input element configured to allow a provider user to input information into the consumer user device; and
   an output element configured to provide the provider user with information from the consumer user device; and
   a server configured to:
   receive an input identifying the consumer user;
   retrieve a consumer characterization value based on inputs received from the consumer user device from a user database, wherein the user characterization value comprises a first component characterizing at least one user attribute and a second component characterizing a project attribute, wherein the at least one user attribute characterizes a tolerance of the consumer user for a project being late or over budget;
   retrieve a provider characterization value based on inputs received from the provider user device from a provider database, wherein the provider characterization value comprises a first component characterizing at least one provider attribute and a second component characterizing a completed project attribute, wherein the at least one provider attribute characterizes a risk exposure based on past performance of the provider related to projects being late or over budget;
   identify a provider group comprising a plurality of providers based on a calculated delta value for each particular provider of the provider group, wherein the calculated delta value for each particular provider is based at least in part on:
   a personality compatibility between the consumer user and the particular provider, and
   a relative difference between the tolerance of the consumer user for a project being late or over budget and the risk exposure of the particular provider;
   generate a ranking of the providers of the provider group based on the calculated delta value;
   generate a pairing alert configured to cause the activation of the consumer user device to display an alert indicating the ranking of the providers in the group of providers and prompting a selection of one or more of the providers;
   send the pairing alert to the consumer user device from the server;
   receive an input selecting at least one of the providers of the provider group in response to the displayed alert; and
   generate a potential alert, wherein the potential alert comprises anonymized consumer information and project information.

2. The system of claim 1, wherein the server is further configured to generate the consumer characterization value.

3. The system of claim 2, wherein the consumer characterization value is generated from an attribute prompt response received in response to an attribute prompt; and a project prompt response received in response to a project prompt.

4. The system of claim 3, wherein generating the consumer characterization value comprises:
   generating first parameters from the received attribute prompt responses;
   generating second parameters from the received project prompt responses;
   retrieving a weighting algorithm; and
   generating an aggregate characterization value from the generated first and second parameters.

5. The system of claim 4, wherein generating the consumer characterization value further comprises applying the weighting algorithm to the first and second parameters to generate weighted values.

6. The system of claim 1, wherein the potential alert comprises computer code configured to activate the provider user device.

7. The system of claim 1, wherein the server is further configured to send the potential alert to the provider user device, when the provider user device is associated with a provider in the provider group.

8. The system of claim 7, wherein the provider characterization value is based in part on information retrieved with location information received from the provider user device, wherein the location information is generated via a GPS receiver.

9. A method of pairing a provider user device and a consumer user device, the method comprising:
   receiving at a server an input identifying a consumer user from a consumer user device;
   retrieving with the server a consumer characterization value from a user database, wherein the consumer characterization value comprises a first component characterizing at least one user attribute and a second component characterizing a project attribute, wherein the at least one user attribute characterizes a tolerance of the consumer user for a project being late or over budget;
   retrieving a provider characterization value for each of a plurality of providers from a provider database, wherein the provider characterization value comprises a first component characterizing at least one provider attribute and a second component characterizing a completed project attribute, wherein the at least one provider attribute characterizes a risk exposure based on past performance of the provider related to projects being late or over budget;
   identifying a provider group comprising a plurality of providers based on a calculated delta value for each particular provider of the provider group, wherein the calculated delta value for each particular provider is based at least in part on:
   a personality compatibility between the consumer user and the particular provider, and
   a relative difference between the tolerance of the consumer user for a project being late or over budget and the risk exposure of the particular provider;
   generating a ranking of the providers of the provider group based on the calculated delta value;
   generating a pairing alert configured to cause the activation of the consumer user device to display an alert indicating the ranking of the providers in the group of providers and prompting a selection of one or more of the providers;
   sending the pairing alert to the consumer user device from the server;

receiving an input selecting at least one of the providers of the provider group in response to the displayed alert; and generating a potential alert, wherein the potential alert comprises anonymized consumer information and project information.

10. The method of claim 9, further comprising generating the consumer characterization value.

11. The method of claim 10, wherein the consumer characterization value is generated from an attribute prompt response received in response to an attribute prompt; and a project prompt response received in response to a project prompt.

12. The method of claim 11, wherein generating the consumer characterization value comprises:
generating first parameters from the received attribute prompt responses;
generating second parameters from the received project prompt responses;
retrieving a weighting algorithm; and
generating an aggregate characterization value from the generated first and second parameters.

13. The method of claim 12, wherein generating the consumer characterization value further comprises applying the weighting algorithm to the first and second parameters to generate weighted values.

14. The method of claim 9, wherein the potential alert comprises computer code configured to activate the provider user device.

15. The method of claim 9, further comprising sending the potential alert to the provider user device, when the provider user device is associated with a provider in the provider group.

16. The method of claim 15, wherein the provider characterization value is based in part on information retrieved with location information received from the provider user device, wherein the location information is generated via a GPS receiver.

* * * * *